(12) United States Patent
Chen et al.

(10) Patent No.: US 8,948,258 B2
(45) Date of Patent: *Feb. 3, 2015

(54) VIDEO CODING WITH LARGE MACROBLOCKS

(71) Applicant: QUALCOMM Incorporated, San Diego, CA (US)

(72) Inventors: Peisong Chen, San Diego, CA (US); Marta Karczewicz, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/948,056

(22) Filed: Jul. 22, 2013

(65) Prior Publication Data

US 2013/0308701 A1 Nov. 21, 2013

Related U.S. Application Data

(63) Continuation of application No. 12/562,504, filed on Sep. 18, 2009, now Pat. No. 8,503,527.

(60) Provisional application No. 61/102,787, filed on Oct. 23, 2008, provisional application No. 61/144,357, filed on Jan. 13, 2009, provisional application No. 61/166,631, filed on Apr. 3, 2009.

(51) Int. Cl.
  *G01R 31/08* (2006.01)
  *G06F 11/00* (2006.01)
  (Continued)

(52) U.S. Cl.
  CPC ... *H04N 19/00763* (2013.01); *H04N 19/00884* (2013.01); *H04N 19/00278* (2013.01);
  (Continued)

(58) Field of Classification Search
  USPC .................................................. 375/240.12
  See application file for complete search history.

(56) References Cited

U.S. PATENT DOCUMENTS

6,980,596 B2 12/2005 Wang et al.
7,529,302 B2 5/2009 Mukerjee et al.
(Continued)

FOREIGN PATENT DOCUMENTS

CN 1810037 A 7/2006
CN 101019435 A 8/2007
(Continued)

OTHER PUBLICATIONS

Bo-Yuan Chen, et al., "Using H.264 Coded Block Patterns for Fast Inter-Mode Selection," Multimedia and Expo, 2008 IEEE, Jun. 23, 2008, pp. 721-724.
(Continued)

*Primary Examiner* — Mark Rinehart
*Assistant Examiner* — Maharishi Khirodhar
(74) *Attorney, Agent, or Firm* — John Rickenbrode

(57) ABSTRACT

Techniques are described for encoding and decoding digital video data using macroblocks that are larger than the macroblocks prescribed by conventional video encoding and decoding standards. For example, the techniques include encoding and decoding a video stream using macroblocks comprising greater than 16×16 pixels. In one example, an apparatus includes a video encoder configured to encode a coded unit comprising a plurality of video blocks, wherein at least one of the plurality of video blocks comprises a size of more than 16×16 pixels and to generate syntax information for the coded unit that includes a maximum size value, wherein the maximum size value indicates a size of a largest one of the plurality of video blocks in the coded unit. The syntax information may also include a minimum size value. In this manner, the encoder may indicate to a decoder the proper syntax decoder to apply to the coded unit.

34 Claims, 18 Drawing Sheets

(51) Int. Cl.
*H04N 19/593* (2014.01)
*H04N 19/70* (2014.01)
*H04N 19/176* (2014.01)
*H04N 19/147* (2014.01)
*H04N 19/61* (2014.01)
*H04N 19/103* (2014.01)
*H04N 19/46* (2014.01)

(52) U.S. Cl.
CPC ... *H04N19/00175* (2013.01); *H04N 19/00781* (2013.01); *H04N 19/00018* (2013.01); *H04N 19/00545* (2013.01)
USPC .................................................. 375/240.12

(56) References Cited

U.S. PATENT DOCUMENTS

| | | | |
|---|---|---|---|
| 7,895,250 | B2 | 2/2011 | Xiao et al. |
| 8,169,953 | B2 | 5/2012 | Damnjanovic et al. |
| 8,335,261 | B2 | 12/2012 | Karczewicz et al. |
| 8,483,285 | B2 | 7/2013 | Ye et al. |
| 8,503,527 | B2 | 8/2013 | Chen et al. |
| 2003/0229719 | A1* | 12/2003 | Iwata et al. ............ 709/247 |
| 2004/0062309 | A1 | 4/2004 | Romanowski et al. |
| 2004/0066974 | A1 | 4/2004 | Karczewicz et al. |
| 2004/0140916 | A1 | 7/2004 | Ji |
| 2004/0233989 | A1 | 11/2004 | Kobayashi et al. |
| 2005/0025246 | A1 | 2/2005 | Holcomb |
| 2005/0053292 | A1 | 3/2005 | Mukerjee et al. |
| 2005/0101319 | A1 | 5/2005 | Murali et al. |
| 2005/0249291 | A1 | 11/2005 | Gordon et al. |
| 2006/0126740 | A1 | 6/2006 | Lin et al. |
| 2006/0133495 | A1 | 6/2006 | Ye et al. |
| 2006/0153297 | A1 | 7/2006 | Boyce |
| 2006/0203905 | A1 | 9/2006 | Hsia |
| 2006/0227867 | A1 | 10/2006 | Winger et al. |
| 2007/0030903 | A1 | 2/2007 | Cote et al. |
| 2007/0160303 | A1 | 7/2007 | Guleryuz et al. |
| 2007/0206679 | A1 | 9/2007 | Lim et al. |
| 2007/0230563 | A1 | 10/2007 | Tian et al. |
| 2008/0025391 | A1 | 1/2008 | Amon et al. |
| 2008/0049834 | A1 | 2/2008 | Holcomb et al. |
| 2008/0130755 | A1 | 6/2008 | Loukas et al. |
| 2008/0152008 | A1 | 6/2008 | Sun et al. |
| 2008/0192824 | A1 | 8/2008 | Lim et al. |
| 2008/0310504 | A1 | 12/2008 | Ye et al. |
| 2008/0310507 | A1 | 12/2008 | Ye et al. |
| 2008/0310512 | A1 | 12/2008 | Ye et al. |
| 2010/0086029 | A1 | 4/2010 | Chen et al. |
| 2010/0086030 | A1 | 4/2010 | Chen et al. |
| 2010/0086031 | A1 | 4/2010 | Chen et al. |
| 2012/0120320 | A1* | 5/2012 | Chowdhry et al. .......... 348/586 |

FOREIGN PATENT DOCUMENTS

| | | |
|---|---|---|
| CN | 101175210 A | 5/2008 |
| EP | 1429564 A1 | 6/2004 |
| JP | 63121372 A | 5/1988 |
| JP | 11164305 A | 6/1999 |
| JP | 2003319394 A | 11/2003 |
| JP | 2003533141 A | 11/2003 |
| JP | 2004222311 A | 8/2004 |
| JP | 2006304107 A | 11/2006 |
| JP | 2006339774 A | 12/2006 |
| JP | 2007243427 A | 9/2007 |
| JP | 2008521303 A | 6/2008 |
| JP | 2008526119 A | 7/2008 |
| JP | 2008219870 A | 9/2008 |
| JP | 2009510965 A | 3/2009 |
| JP | 2009532990 A | 9/2009 |
| JP | 2010502102 A | 1/2010 |
| JP | 2010136383 A | 6/2010 |
| JP | 2010525654 A | 7/2010 |
| JP | 2011501566 A | 1/2011 |
| JP | 2011523321 A | 8/2011 |
| RU | 2307478 C2 | 9/2007 |
| RU | 2330325 C2 | 7/2008 |
| TW | 463505 B | 11/2001 |
| TW | 200835343 A | 8/2008 |
| TW | 200838317 | 9/2008 |
| WO | 0186961 A1 | 11/2001 |
| WO | 03021971 A1 | 3/2003 |
| WO | 03047268 A2 | 6/2003 |
| WO | 03075579 A2 | 9/2003 |
| WO | 2006028088 A1 | 3/2006 |
| WO | 2006069297 | 6/2006 |
| WO | 2006128076 A2 | 11/2006 |
| WO | 2007034918 A1 | 3/2007 |
| WO | 2007040297 A1 | 4/2007 |
| WO | 2007115126 | 10/2007 |
| WO | 2007117711 A2 | 10/2007 |
| WO | 2008027192 | 3/2008 |
| WO | WO 2008027192 A2 * | 3/2008 |
| WO | 2008082102 A1 | 7/2008 |
| WO | 2008127080 A1 | 10/2008 |
| WO | 2009051719 A2 | 4/2009 |

OTHER PUBLICATIONS

Chen P., et al., "Video Coding Using Extended Block Sizes," 36th Meeting, VCEG, Oct. 8, 2008, San Diego, Video Coding Experts Group, ITU-T, Q.6, SG.16, (Oct. 15, 2008), XP030003645.

Information Technology-Coding of Audio-Visual Objects—Part 10: Advanced Video Coding, ISO/IEC 14496-10:2005.

International Search Report & Written Opinion-PCT/US09/058833, International Search Authority European Patent Office Apr. 29, 2010.

ITU-T Recommendation H.264, Advanced Video Coding for Generic Audiovisual Services. Section 8.4. Mar. 2005.

Joint video team (JVT) of ISO/IEC MPEG and ITU-T VCEG, 8th, meeting: Geneva Switzerland, May 23-27, 2003, all Pages.

JVT / Sullivan et al: "Draft ITU-T H.264:2004 Amd. 1 ISO/IEC 14496-10:2004/FDAMI AVC FRExt" Joint Video Team (JVT) of ISO/IEC MPEG & ITU-T VCEG(ISO/IEC JTC1/SC29/WG11 and ITU-T SG16 Q.6), No. JVT-L047d12, Jul. 23, 2004, XP030005899 Subclauses 7.4.2.2 and 7.4.5; pp. 30-32.

JVT: "Draft ITU-T Recommendation and Final Draft International Standard of Joint Video Specification (ITU-T Rec. H .264 ISO/IEC 14496-10 AVC)", 7. JVT Meeting; 64. MPEG Meeting; Mar. 7, 2003-Mar. 14-2003; Pattaya,TH; (Joint Video Team of ISO/IEC JTC1/SC29/WG11 and ITU-T 56.16 ), No. JVT-G050r1, Mar. 14, 2003, XP030005712, ISSN: 0000-0427.

JVT: "Text of Joint FCD for Joint Video Specification" Joint Video Team (JVT) of ISO/IEC MPEG & ITU-T VCEG (ISO/IEC JTC1/SC29/WG11 and ITU-T SG16 06), No. JVT-D157, Aug. 10, 2002, XP030005420 sections 8.4-8.6, section 12.

Kim J., et al., "Enlarging MB Size for High Fidelity Video Coding Beyond HD" 36th VCEG Meeting Oct. 8, 2008 San Diego US, Video Coding Experts Group of ITU-T SG.16 Q.6) (Oct. 5, 2008), XP030003643.

Kondo Satoshi et al., "A motion compensation Technique Using Sliced Blocks in Hybrid Video Coding", IEEE International Conference on Image Processing (ICIP), 2005, pp. 305-308, vol. 2 DOI: 10.1109/ICIP.2005.1530052, ISBN: 0-7803-9134-9.

Lee et. al.,"Technical considerations for Ad Hoc Group on New Challenges in Video Coding standardization," ISO/IEC JTC1/SC29/WG11 MPEG2008/M15580, Hannover, Germany, Jul. 2008.

Lim, S. et al., "Intra Coding Using Extended Block Size" 38 VCEG Meeting; Jul. 1, 2009-Jul. 8, 2009 London, Geneva, Video Coding Experts Group of ITU-T SG.16 Q.6) Jul. 7, 2009.

Ma, S., et al., "High-Definition Video Coding With Super-Macroblocks (Invited Paper)" Visual Communications and Image Processing; Jan. 30, 2007-Feb. 1, 2007 San Jose, Jan. 30, 2007, XP030081117.

Marpe D., et al., "H. 264/ MPEG4-AVC Fidelity Range Extensions: Tools, Profiles, Performance, and Application Areas" Image Processing, 2005. ICIP 2005. IEEE International Conference on Genova, Italy Sep. 11-14, 2005, Piscataway, NJ, USA,IEEE, vol. 1, Sep. 11, 2005, pp. 593-596, XP010850819 ISBN: 978-0-7803-9134-5 section II.

(56) References Cited

OTHER PUBLICATIONS

Milani, S., et al., Achieving H.264-like compression efficiency with distributed video coding, Visual Communications and Image Processing (VCIP), Jan. 2007.

Naito, S., et al., "Efficient Coding Scheme for Super High Definition Video Based on Extending H.264 High Profile" Proceedings of the SPIE—The International Society for Optical Engineering, SPIE, US vol. 6077., No. 67727 Jan. 18, 2006 pp. 1-8, XP002538136.

Ono S et al., "Ubiquitous Technology, High-Efficiency Coding of Moving Images—MPEG-4 and H.264-," Ohmsha Ltd., 1st ed., Apr. 20, 2005, pp. 101-120, ISBN: 4-274-20060-4.

Puri, et al., "Video Coding Using the H.264/Mpeg-4 Avc Compression Standard," Signal Processing Image Communication, Elsevier Science Publishers, Oct. 1, 2004, pp. 793-849, vol. 19 (9),Amsterdam, NL, XP004607150, ISSN: 0923-5965.

Qualcomm Inc, Video Coding Using Extended Block Sizes ITU (International Telecommunication Union) Study Group 16, vol. COM 16-C 123-E, (Jan. 1, 2009), p. 4pp, XP007912516.

Richardson, L., "Video Coding H.264 and MPEG-4—new generation standards", Moscow, Technosphere, 2005, pp. 330-336.

Taiwan Search Report—TW098133629—TIPO—Aug. 28, 2012.

Ugur K., "An efficient H.264 based fine-granular-scalable video coding system", Proc. of the IEEE Workshop on Signal Processing Systems Design and Implementation 2005, Nov. 2005, p. 399-402, ISBN:0-7803-9333-3.

Wenger S.,"A High Level Syntax for H.26L: First Results, Technische Universitat Berlin, Department of computer science", 2000.

Wien, M., "Adaptive Block Transforms (ABT)" Joint Video Team (JVT) of ISO/IEC MPEG & ITU-T VCEG(ISO/IEC JTC1/SC29/WG11 and ITU-T SG16 Q6), No. VCEG-M62, Mar. 28, 2001, XP030003232 pp. 1-2.

Wien M et al: "Hybrid video coding using variable size block transforms" Visual Communications and Image Processing; Jan. 21, 2002-Jan. 23, 2002; San Jose, Jan. 21, 2002, XP030080600 abstract sections 1, 3 and 4.

Wien, M. et al., "Simplified Adaptive Block Transforms" Joint Video Team (JVT) of ISO/IEC MPEG & ITU-T VCEG(ISO/IEC JTC1/SC29/WG11 and ITU-T SG16 06), No. VCEG-030, Jan. 4, 2002, XP030003363 p. 1.

Xu H., et.al., "Lifting-Based Directional DCT-Like Transform for Image Coding", IEEE Transactions on Circuits and Systems for Video Technology, vol. 17, No. 10, Oct. 2007, pp. 1325-1335, ISSN:1051-8215.

Ye,Y. et al., "Improved intra coding", 33. VCEG Meeting; 82. MPEG Meeting; Oct. 20, 2007-Oct. 20, 2007; Shenzhen; (Video Coding Experts Group of ITU-T SG.16), No. VCEG-AG11, Oct. 20, 2007, XP030003615, ISSN: 0000-0095.

Ikai T., et al., "Study on to Improve Smooth Area Image Quality," FIT2008 Proceedings of 7th Forum on Information Technology, Japan, the Institute of Electronics, Information and Communication Engineers (and 1 other), Aug. 20, 2008, 3rd Separate Volume, pp. 237-238.

Ma, S., et al., "High-definition video coding with super-macro blocks," In Electronic Imaging 2007 (pp. 650816-650816), International Society for Optics and Photonics, (Jan. 2007).

Matsumura Atsushi et al., "An Effective Maximum Macroblock Size Decision Scheme in High Compression Encoding for Super High Definition Images", IPSJ SIG Technical Reports, 2005, vol. 2005, No. 98 (AVM-50), pp. 29-34, ISSN: 0919-6072.

Matsumura Atsushi et al., "Improved Coding Scheme for Super High Definition Videos by Using H.264 High Profile Coding Framework with Extended Macroblock Size", The Journal of the Institute of Image Information and Television Engineers, 2007 ,vol. 61 No. 5, pp. 665-673, ISSN:1342-6907.

Sakaida S., et al., "Coding of Super-High Video via Expansion of AVC/H.264 Transform Block Size," Proceedings of the 2006 IEICE General Conference, Japan, the Institute of Electronics, Information and Communication Engineers, Mar. 8, 2006, Separate Volume: Information and System 2, p. 41, ISSN: 1349-1369.

Okubo, S., "Impress Standard Textbook Series—3rd Revision of H264/AVC Textbook," 1st Edition, Jan. 1, 2009, Impress R&D, pp. 117-119, 326 and 332-336, ISBN: 978-4-8443-2664-9.

\* cited by examiner

VIDEO CODING WITH LARGE MACROBLOCKS

This application is a continuation of U.S. application Ser. No. 12/562,504, filed Sep. 18, 2009, which claims the benefit of U.S. Provisional Application Ser. Nos. 61/102,787 filed on Oct. 3, 2008, 61/144,357 filed on Jan. 13, 2009, and 61/166,631 filed on Apr. 3, 2009, each of which is incorporated herein by reference in its entirety.

This application is related to U.S. patent application Ser. No. 12/562,412, filed Sep. 18, 2009 and U.S. patent application Ser. No. 12/562,438, filed Sep. 18, 2009, which are assigned to the assignee hereof and hereby expressly incorporated by reference in their entirety for all purposes.

TECHNICAL FIELD

This disclosure relates to digital video coding and, more particularly, block-based video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for encoding digital video data using large macroblocks. Large macroblocks are larger than macroblocks generally prescribed by existing video encoding standards. Most video encoding standards prescribe the use of a macroblock in the form of a 16×16 array of pixels. In accordance with this disclosure, an encoder and decoder may utilize large macroblocks that are greater than 16×16 pixels in size. As examples, a large macroblock may have a 32×32, 64×64, or larger array of pixels.

Video coding relies on spatial and/or temporal redundancy to support compression of video data. Video frames generated with higher spatial resolution and/or higher frame rate may support more redundancy. The use of large macroblocks, as described in this disclosure, may permit a video coding technique to utilize larger degrees of redundancy produced as spatial resolution and/or frame rate increase. In accordance with this disclosure, video coding techniques may utilize a variety of features to support coding of large macroblocks.

As described in this disclosure, a large macroblock coding technique may partition a large macroblock into partitions, and use different partition sizes and different coding modes, e.g., different spatial (I) or temporal (P or B) modes, for selected partitions. As another example, a coding technique may utilize hierarchical coded block pattern (CBP) values to efficiently identify coded macroblocks and partitions having non-zero coefficients within a large macroblock. As a further example, a coding technique may compare rate-distortion metrics produced by coding using large and small macroblocks to select a macroblock size producing more favorable results.

In one example, the disclosure provides a method comprising encoding, with a video encoder, a video block having a size of more than 16×16 pixels, generating block-type syntax information that indicates the size of the block, and generating a coded block pattern value for the encoded block, wherein the coded block pattern value indicates whether the encoded block includes at least one non-zero coefficient.

In another example, the disclosure provides an apparatus comprising a video encoder configured to encode a video block having a size of more than 16×16 pixels, generate block-type syntax information that indicates the size of the block, and generate a coded block pattern value for the encoded block, wherein the coded block pattern value indicates whether the encoded block includes at least one non-zero coefficient.

In another example, the disclosure provides a computer-readable medium encoded with instructions to cause a video encoding apparatus to encode, with a video encoder, a video block having a size of more than 16×16 pixels, generate block-type syntax information that indicates the size of the block, and generate a coded block pattern value for the encoded block, wherein the coded block pattern value indicates whether the encoded block includes at least one non-zero coefficient.

In an additional example, the disclosure provides a method comprising receiving, with a video decoder, an encoded video block having a size of more than 16×16 pixels, receiving block-type syntax information that indicates the size of the encoded block, receiving a coded block pattern value for the encoded block, wherein the coded block pattern value indicates whether the encoded block includes at least one non-zero coefficient, and decoding the encoded block based on the block-type syntax information and the coded block pattern value for the encoded block.

In a further example, the disclosure provides an apparatus comprising a video decoder configured to receive an encoded video block having a size of more than 16×16 pixels, receive block-type syntax information that indicates the size of the encoded block, receive a coded block pattern value for the encoded block, wherein the coded block pattern value indicates whether the encoded block includes at least one non-zero coefficient, and decode the encoded block based on the block-type syntax information and the coded block pattern value for the encoded block.

In another example, the disclosure provides a computer-readable medium comprising instructions to cause a video decoder to receive an encoded video block having a size of more than 16×16 pixels, receive block-type syntax information that indicates the size of the encoded block, receive a coded block pattern value for the encoded block, wherein the coded block pattern value indicates whether the encoded block includes at least one non-zero coefficient, and decode the encoded block based on the block-type syntax information and the coded block pattern value for the encoded block.

In another example, the disclosure provides a method comprising receiving, with a video encoder, a video block having a size of more than 16×16 pixels, partitioning the block into partitions, encoding one of the partitions using a first encoding mode, encoding another of the partitions using a second encoding mode different from the first encoding mode, and generating block-type syntax information that indicates the size of the block and identifies the partitions and the encoding modes used to encode the partitions.

In an additional example, the disclosure provides an apparatus comprising a video encoder configured to receive a video block having a size of more than 16×16 pixels, partition the block into partitions, encode one of the partitions using a first encoding mode, encode another of the partitions using a second encoding mode different from the first encoding mode, generate block-type syntax information that indicates the size of the block and identifies the partitions and the encoding modes used to encode the partitions.

In another example, the disclosure provides a computer-readable medium encoded with instructions to cause a video encoder to receive a video block having a size of more than 16×16 pixels, partition the block into partitions, encode one of the partitions using a first encoding mode, encode another of the partitions using a second encoding mode different from the first encoding mode, and generate block-type syntax information that indicates the size of the block and identifies the partitions and the encoding modes used to encode the partitions.

In a further example, the disclosure provides a method comprising receiving, with a video decoder, a video block having a size of more than 16×16 pixels, wherein the block is partitioned into partitions, one of the partitions is encoded with a first encoding mode and another of the partitions is encoded with a second encoding mode different from the first encoding mode, receiving block-type syntax information that indicates the size of the block and identifies the partitions and the encoding modes used to encode the partitions, and decoding the video block based on the block-type syntax information.

In another example, the disclosure provides an apparatus comprising a video decoder configured to receive a video block having a size of more than 16×16 pixels, wherein the block is partitioned into partitions, one of the partitions is encoded with a first encoding mode and another of the partitions is encoded with a second encoding mode different from the first encoding mode, receive block-type syntax information that indicates the size of the block and identifies the partitions and the encoding modes used to encode the partitions, and decode the video block based on the block-type syntax information.

In an additional example, the disclosure provides a computer-readable medium encoded with instructions to cause a video decoder to receive, with a video decoder, a video block having a size of more than 16×16 pixels, wherein the block is partitioned into partitions, one of the partitions is encoded with a first encoding mode and another of the partitions is encoded with a second encoding mode different from the first encoding mode, receive block-type syntax information that indicates the size of the block and identifies the partitions and the encoding modes used to encode the partitions, and decode the video block based on the block-type syntax information.

In another example, the disclosure provides a method comprising receiving, with a digital video encoder, a video coding unit, determining a first rate-distortion metric for encoding the video coding unit using first video blocks with sizes of 16×16 pixels, determining a second rate-distortion metric for encoding the video coding unit using second video blocks with sizes of more than 16×16 pixels, encoding the video coding unit using the first video blocks when the first rate-distortion metric is less than second rate-distortion metric, and encoding the video coding unit using the second video blocks when the second rate-distortion metric is less than the first rate-distortion metric.

In an additional example, the disclosure provides an apparatus comprising a video encoder configured to receive a video coding unit, determine a first rate-distortion metric for encoding the video coding unit using first video blocks with sizes of 16×16 pixels, determine a second rate-distortion metric for encoding the video coding unit using second video blocks with sizes of more than 16×16 pixels, encode the video coding unit using the first video blocks when the first rate-distortion metric is less than second rate-distortion metric, encode the video coding unit using the second video blocks when the second rate-distortion metric is less than the first rate-distortion metric.

In another example, the disclosure provides a computer-readable medium encoded with instructions to cause a video encoder to receive a video coding unit, determine a first rate-distortion metric for encoding the video coding unit using first video blocks with sizes of 16×16 pixels, determine a second rate-distortion metric for encoding the video coding unit using second video blocks with sizes of more than 16×16 pixels, encode the video coding unit using the first video blocks when the first rate-distortion metric is less than second rate-distortion metric, and encode the video coding unit using the second video blocks when the second rate-distortion metric is less than the first rate-distortion metric.

In another example, the disclosure provides a method comprising encoding, with a video encoder, a coded unit comprising a plurality of video blocks, wherein at least one of the plurality of video blocks comprises a size of more than 16×16 pixels, and generating syntax information for the coded unit that includes a maximum size value, wherein the maximum size value indicates a size of a largest one of the plurality of video blocks in the coded unit.

In another example, the disclosure provides an apparatus comprising a video encoder configured to encode a coded unit comprising a plurality of video blocks, wherein at least one of the plurality of video blocks comprises a size of more than 16×16 pixels and to generate syntax information for the coded unit that includes a maximum size value, wherein the maximum size value indicates a size of a largest one of the plurality of video blocks in the coded unit.

In another example, the disclosure provides an apparatus comprising apparatus comprising means for encoding a coded unit comprising a plurality of video blocks, wherein at least one of the plurality of video blocks comprises a size of more than 16×16 pixels, and means for generating syntax information for the coded unit that includes a maximum size value, wherein the maximum size value indicates a size of a largest one of the plurality of video blocks in the coded unit.

In another example, the disclosure provides a computer-readable storage medium encoded with instructions for causing a programmable processor to encode a coded unit comprising a plurality of video blocks, wherein at least one of the plurality of video blocks comprises a size of more than 16×16 pixels, and generate syntax information for the coded unit that includes a maximum size value, wherein the maximum size value indicates a size of a largest one of the plurality of video blocks in the coded unit.

In another example, the disclosure provides a method comprising receiving, with a video decoder, a coded unit comprising a plurality of video blocks, wherein at least one of the plurality of video blocks comprises a size of more than 16×16 pixels, receiving syntax information for the coded unit that includes a maximum size value, wherein the maximum size value indicates a size of a largest one of the plurality of video blocks in the coded unit, selecting a block-type syntax decoder according to the maximum size value, and decoding each of the plurality of video blocks in the coded unit using the selected block-type syntax decoder.

In another example, the disclosure provides an apparatus comprising a video decoder configured to receive a coded unit comprising a plurality of video blocks, wherein at least one of the plurality of video blocks comprises a size of more than 16×16 pixels, receive syntax information for the coded unit that includes a maximum size value, wherein the maximum size value indicates a size of a largest one of the plurality of video blocks in the coded unit, select a block-type syntax decoder according to the maximum size value, and decode each of the plurality of video blocks in the coded unit using the selected block-type syntax decoder.

In another example, the disclosure provides means for receiving a coded unit comprising a plurality of video blocks, wherein at least one of the plurality of video blocks comprises a size of more than 16×16 pixels, means for receiving syntax information for the coded unit that includes a maximum size value, wherein the maximum size value indicates a size of a largest one of the plurality of video blocks in the coded unit, means for selecting a block-type syntax decoder according to the maximum size value, and means for decoding each of the plurality of video blocks in the coded unit using the selected block-type syntax decoder.

In another example, the disclosure provides a computer-readable storage medium encoded with instructions for causing a programmable processor to receive a coded unit comprising a plurality of video blocks, wherein at least one of the plurality of video blocks comprises a size of more than 16×16 pixels, receive syntax information for the coded unit that includes a maximum size value, wherein the maximum size value indicates a size of a largest one of the plurality of video blocks in the coded unit, select a block-type syntax decoder according to the maximum size value, and decode each of the plurality of video blocks in the coded unit using the selected block-type syntax decoder.

The details of one or more examples are set forth in the accompanying drawings and the description below. Other features, objects, and advantages will be apparent from the description and drawings, and from the claims.

DETAILED DESCRIPTION

Figure 1:
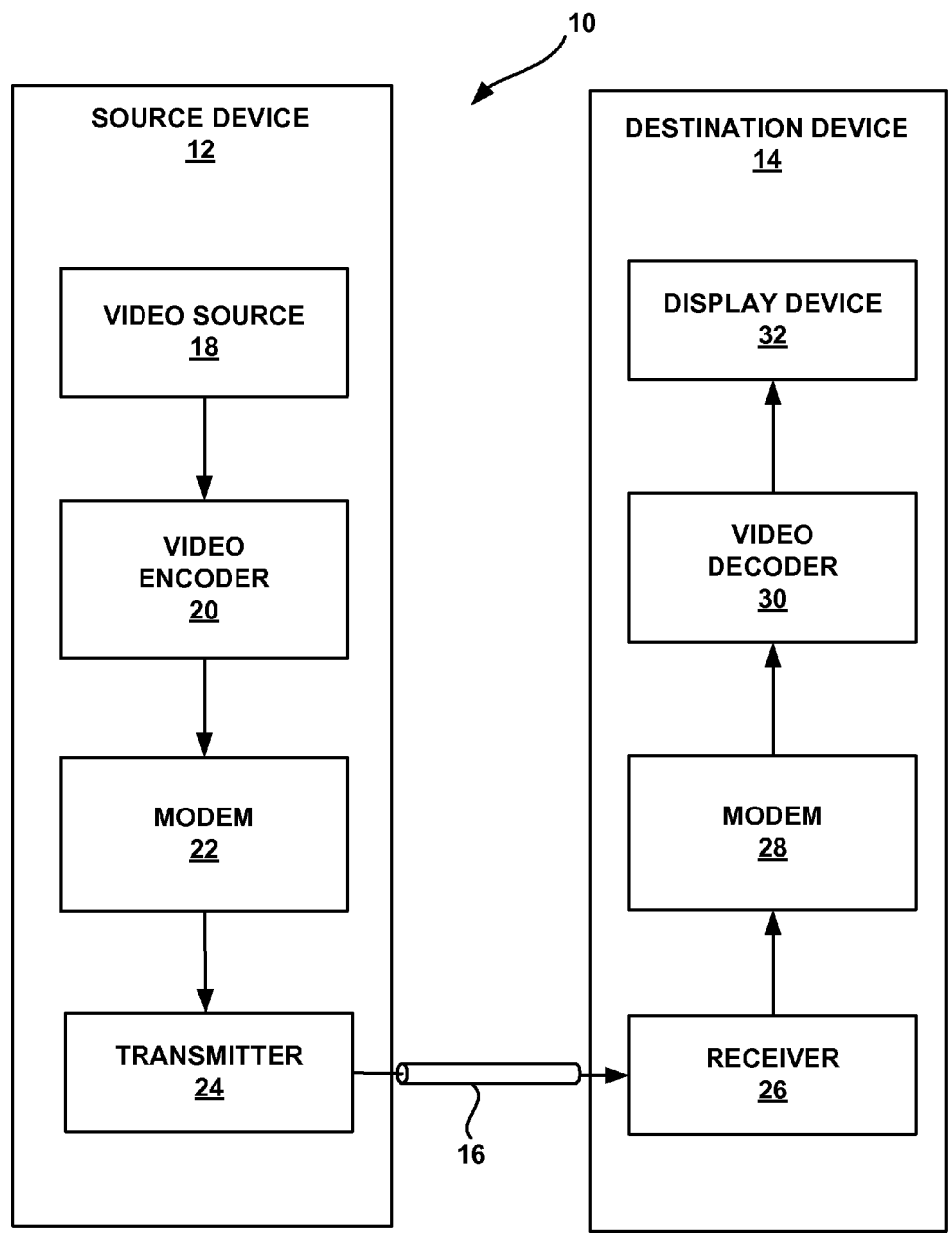
FIG. 1 is a block diagram illustrating an example video encoding and decoding system that encodes and decodes digital video data using large macroblocks.

The disclosure describes techniques for encoding and decoding digital video data using large macroblocks. Large macroblocks are larger than macroblocks generally prescribed by existing video encoding standards. Most video encoding standards prescribe the use of a macroblock in the form of a 16×16 array of pixels. In accordance with this disclosure, an encoder and/or a decoder may utilize large macroblocks that are greater than 16×16 pixels in size. As examples, a large macroblock may have a 32×32, 64×64, or possibly larger array of pixels.

In general, a macroblock, as that term is used in this disclosure, may refer to a data structure for a pixel array that comprises a defined size expressed as N×N pixels, where N is a positive integer value. The macroblock may define four luminance blocks, each comprising an array of (N/2)×(N/2) pixels, two chrominance blocks, each comprising an array of N×N pixels, and a header comprising macroblock-type information and coded block pattern (CBP) information, as discussed in greater detail below.

Conventional video coding standards ordinarily prescribe that the defined macroblock size is a 16×16 array of pixels. In accordance with various techniques described in this disclosure, macroblocks may comprise N×N arrays of pixels where N may be greater than 16. Likewise, conventional video coding standards prescribe that an inter-encoded macroblock is typically assigned a single motion vector. In accordance with various techniques described in this disclosure, a plurality of motion vectors may be assigned for inter-encoded partitions of an N×N macroblock, as described in greater detail below.

References to "large macroblocks" or similar phrases generally refer to macroblocks with arrays of pixels greater than 16×16.

In some cases, large macroblocks may support improvements in coding efficiency and/or reductions in data transmission overhead while maintaining or possibly improving image quality. For example, the use of large macroblocks may permit a video encoder and/or decoder to take advantage of increased redundancy provided by video data generated with increased spatial resolution (e.g., 1280×720 or 1920×1080 pixels per frame) and/or increased frame rate (e.g., 30 or 60 frames per second).

As an illustration, a digital video sequence with a spatial resolution of 1280×720 pixels per frame and a frame rate of 60 frames per second is spatially 36 times larger than and temporally 4 times faster than a digital video sequence with a spatial resolution of 176×144 pixels per frame and a frame rate of 15 frames per second. With increased macroblock size, a video encoder and/or decoder can better exploit increased spatial and/or temporal redundancy to support compression of video data.

Also, by using larger macroblocks, a smaller number of blocks may be encoded for a given frame or slice, reducing the amount of overhead information that needs to be transmitted. In other words, larger macroblocks may permit a reduction in the overall number of macroblocks coded per frame or slice. If the spatial resolution of a frame is increased by four times, for example, then four times as many 16×16 macroblocks would be required for the pixels in the frame. In this example, with 64×64 macroblocks, the number of macroblocks needed to handle the increased spatial resolution is reduced. With a reduced number of macroblocks per frame or slice, for example, the cumulative amount of coding information such as syntax information, motion vector data, and the like can be reduced.

In this disclosure, the size of a macroblock generally refers to the number of pixels contained in the macroblock, e.g., 64×64, 32×32, 16×16, or the like. Hence, a large macroblock (e.g., 64×64 or 32×32) may be large in the sense that it contains a larger number of pixels than a 16×16 macroblock. However, the spatial area defined by the vertical and horizontal dimensions of a large macroblock, i.e., as a fraction of the area defined by the vertical and horizontal dimensions of a video frame, may or may not be larger than the area of a conventional 16×16 macroblock. In some examples, the area of the large macroblock may be the same or similar to a conventional 16×16 macroblock. However, the large macroblock has a higher spatial resolution characterized by a higher number and higher spatial density of pixels within the macroblock.

The size of the macroblock may be configured based at least in part on the number of pixels in the frame, i.e., the spatial resolution in the frame. If the frame has a higher number of pixels, a large macroblock can be configured to have a higher number of pixels. As an illustration, a video encoder may be configured to utilize a 32×32 pixel macroblock for a 1280×720 pixel frame displayed at 30 frames per second. As another illustration, a video encoder may be configured to utilize a 64×64 pixel macroblock for a 1280×720 pixel frame displayed at 60 frames per second.

Each macroblock encoded by an encoder may require data that describes one or more characteristics of the macroblock. The data may indicate, for example, macroblock type data to represent the size of the macroblock, the way in which the macroblock is partitioned, and the coding mode (spatial or temporal) applied to the macroblock and/or its partitions. In addition, the data may include motion vector difference (mvd) data along with other syntax elements that represents motion vector information for the macroblock and/or its partitions. Also, the data may include a coded block pattern (CBP) value along with other syntax elements to represent residual information after prediction. The macroblock type data may be provided in a single macroblock header for the large macroblock.

As mentioned above, by utilizing a large macroblock, the encoder may reduce the number of macroblocks per frame or slice, and thereby reduce the amount of net overhead that needs to be transmitted for each frame or slice. Also, by utilizing a large macroblock, the total number of macroblocks may decrease for a particular frame or slice, which may reduce blocky artifacts in video displayed to a user.

Video coding techniques described in this disclosure may utilize one or more features to support coding of large macroblocks. For example, a large macroblock may be partitioned into smaller partitions. Different coding modes, e.g., different spatial (I) or temporal (P or B) coding modes, may be applied to selected partitions within a large macroblock. Also, a hierarchical coded block pattern (CBP) values can be utilized to efficiently identify coded macroblocks and partitions having non-zero transform coefficients representing residual data. In addition, rate-distortion metrics may be compared for coding using large and small macroblock sizes to select a macroblock size producing favorable results. Furthermore, a coded unit (e.g., a frame, slice, sequence, or group of pictures) comprising macroblocks of varying sizes may include a syntax element that indicates the size of the largest macroblock in the coded unit. As described in greater detail below, large macroblocks comprise a different block-level syntax than standard 16×16 pixel blocks. Accordingly, by indicating the size of the largest macroblock in the coded unit, an encoder may signal to a decoder a block-level syntax decoder to apply to the macroblocks of the coded unit.

Use of different coding modes for different partitions in a large macroblock may be referred to as mixed mode coding of large macroblocks. Instead of coding a large macroblock uniformly such that all partitions have the same intra- or inter-coding mode, a large macroblock may be coded such that some partitions have different coding modes, such as different intra-coding modes (e.g., I_16×16, I_8×8, I_4×4) or intra- and inter-coding modes.

If a large macroblock is divided into two or more partitions, for example, at least one partition may be coded with a first mode and another partition may be coded with a second mode that is different than the first mode. In some cases, the first mode may be a first I mode and the second mode may be a second I mode, different from the first I mode. In other cases, the first mode may be an I mode and the second mode may be a P or B mode. Hence, in some examples, a large macroblock may include one or more temporally (P or B) coded partitions and one or more spatially (I) coded partitions, or one or more spatially coded partitions with different I modes.

One or more hierarchical coded block pattern (CBP) values may be used to efficiently describe whether any partitions in a large macroblock have at least one non-zero transform coefficient and, if so, which partitions. The transform coefficients encode residual data for the large macroblock. A large macroblock level CBP bit indicates whether any partitions in the large macroblock includes a non-zero, quantized coefficient. If not, there is no need to consider whether any of the partitions has a non-zero coefficient, as the entire large macroblock is known to have no non-zero coefficients. In this case, a predictive macroblock can be used to decode the macroblock without residual data.

Alternatively, if the macroblock-level CBP value indicates that at least one partition in the large macroblock has a non-zero coefficient, then partition-level CBP values can be analyzed to identify which of the partitions includes at least one non-zero coefficient. The decoder then may retrieve appropriate residual data for the partitions having at least one non-zero coefficient, and decode the partitions using the residual data and predictive block data. In some cases, one or more partitions may have non-zero coefficients, and therefore include partition-level CBP values with the appropriate indication. Both the large macroblock and at least some of the partitions may be larger than 16×16 pixels.

To select macroblock sizes yielding favorable rate-distortion metrics, rate-distortion metrics may be analyzed for both large macroblocks (e.g., 32×32 or 64×64) and small macroblocks (e.g., 16×16). For example, an encoder may compare rate-distortion metrics between 16×16 macroblocks, 32×32 macroblocks, and 64×64 macroblocks for a coded unit, such as a frame or a slice. The encoder may then select the macroblock size that results in the best rate-distortion and encode the coded unit using the selected macroblock size, i.e., the macroblock size with the best rate-distortion.

The selection may be based on encoding the frame or slice in three or more passes, e.g., a first pass using 16×16 pixel macroblocks, a second pass using 32×32 pixel macroblocks, and a third pass using 64×64 pixel macroblocks, and comparing rate-distortion metrics for each pass. In this manner, an encoder may optimize rate-distortion by varying the macroblock size and selecting the macroblock size that results in the best or optimal rate-distortion for a given coding unit, such as a slice or frame. The encoder may further transmit syntax information for the coded unit, e.g., as part of a frame header or a slice header, that identifies the size of the macroblocks used in the coded unit. As discussed in greater detail below, the syntax information for the coded unit may comprise a maximum size indicator that indicates a maximum size of macroblocks used in the coded unit. In this manner, the encoder may inform a decoder as to what syntax to expect for macroblocks of the coded unit. When the maximum size of macroblocks comprises 16×16 pixels, the decoder may expect standard H.264 syntax and parse the macroblocks according to H.264-specified syntax. However, when the maximum size of macroblocks is greater than 16×16, e.g., comprises 64×64 pixels, the decoder may expect modified and/or additional syntax elements that relate to processing of larger macroblocks, as described by this disclosure, and parse the macroblocks according to such modified or additional syntax.

For some video frames or slices, large macroblocks may present substantial bit rate savings and thereby produce the best rate-distortion results, given relatively low distortion. For other video frames or slices, however, smaller macroblocks may present less distortion, outweighing bit rate in the rate-distortion cost analysis. Hence, in different cases, 64×64, 32×32 or 16×16 may be appropriate for different video frames or slices, e.g., depending on video content and complexity.

FIG. 1 is a block diagram illustrating an example video encoding and decoding system 10 that may utilize techniques for encoding/decoding digital video data using a large macroblock, i.e., a macroblock that contains more pixels than a 16×16 macroblock. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which concern use of a large macroblock comprising more pixels than macroblocks prescribed by conventional video encoding standards, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 may include a video source 18, video encoder 20, a modulator/demodulator (modem) 22 and a transmitter 24. Destination device 14 may include a receiver 26, a modem 28, a video decoder 30, and a display device 32. In accordance with this disclosure, video encoder 20 of source device 12 may be configured to apply one or more of the techniques for using, in a video encoding process, a large macroblock having a size that is larger than a macroblock size prescribed by conventional video encoding standards. Similarly, video decoder 30 of destination device 14 may be configured to apply one or more of the techniques for using, in a video decoding process, a macroblock size that is larger than a macroblock size prescribed by conventional video encoding standards.

The illustrated system 10 of FIG. 1 is merely one example. Techniques for using a large macroblock as described in this disclosure may be performed by any digital video encoding and/or decoding device. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, an/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to use a large macroblock, e.g., larger than 16×16, for inter (i.e., temporal) and/or intra (i.e., spatial) encoding of video data. The video decoding process performed by video decoder 30 may also use such techniques during the decoding process. The information communicated over channel 16 may include syntax information defined by video encoder 20, which is also used by video decoder 30, that includes syntax elements that describe characteristics and/or processing of the large macroblocks, as discussed in greater detail below. The syntax information may be included in any or all of a frame header, a slice header, a sequence header (for example, with respect to H.264, by using profile and level to which the coded video sequence conforms), or a macroblock header. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively described as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. Video encoder 20 operates on video blocks within individual video frames in order to encode the video data. A video block may correspond to a macroblock or a partition of a macroblock. A video block may further correspond to a partition of a partition. The video blocks may have fixed or varying sizes, and may differ in size according to a specified coding standard or in accordance with the techniques of this disclosure. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "x" and "by" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction and 16 pixels in a horizontal direction. Likewise, an N×N block generally has N pixels in a vertical direction and N pixels in a horizontal direction, where N represents a positive integer value that may be greater than 16. The pixels in a block may be arranged in rows and columns.

Block sizes that are less than 16 by 16 may be referred to as partitions of a 16 by 16 macroblock. Likewise, for an N×N block, block sizes less than N×N may be referred to as partitions of the N×N block. The techniques of this disclosure describe intra- and inter-coding for macroblocks larger than the conventional 16×16 pixel macroblock, such as 32×32 pixel macroblocks, 64×64 pixel macroblocks, or larger macroblocks. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered to be video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as CBP values, macroblock type, coding mode, maximum macroblock size for a coded unit (such as a frame, slice, macroblock, or sequence), or the like.

According to various techniques of this disclosure, video encoder 20 may use a macroblock that is larger than that prescribed by conventional video encoding standards to encode digital video data. In one example, video encoder 20 may encode, with a video encoder, a video block having a size of more than 16×16 pixels, generate block-type syntax information that indicates the size of the block, and generate a CBP value for the encoded block, wherein the coded block pattern value indicates whether the encoded block includes at least one non-zero coefficient. The macroblock block-type syntax information may be provided in a macroblock header for the large macroblock. The macroblock block-type syntax information may indicate an address or position of the macroblock in a frame or slice, or a macroblock number that identifies the position of the macroblock, a type of coding mode applied to the macroblock, a quantization value for the macroblock, any motion vector information for the macroblock and a CBP value for the macroblock.

In another example, video encoder 20 may receive a video block having a size of more than 16×16 pixels, partitioning the block into partitions, encode one of the partitions using a first encoding mode, encode another of the partitions using a second encoding mode different from the first encoding mode, and generate block-type syntax information that indicates the size of the block and identifies the partitions and the encoding modes used to encode the partitions.

In an additional example, video encoder 20 may receive a video coding unit, such as a frame or slice, determine a first rate-distortion metric for encoding the video coding unit using first video blocks with sizes of 16×16 pixels, determine a second rate-distortion metric for encoding the video coding unit using second video blocks with sizes of more than 16×16 pixels, encode the video coding unit using the first video blocks when the first rate-distortion metric is less than second rate-distortion metric, and encode the video coding unit using the second video blocks when the second rate-distortion metric is less than the first rate-distortion metric.

In one example, video decoder 30 may receive an encoded video block having a size of more than 16×16 pixels, receive block-type syntax information that indicates the size of the encoded block, receive a coded block pattern value for the encoded block, wherein the coded block pattern value indicates whether the encoded block includes at least one non-zero coefficient, and decode the encoded block based on the block-type syntax information and the coded block pattern value for the encoded block.

In another example, video decoder 30 may receive a video block having a size of more than 16×16 pixels, wherein the block is partitioned into partitions, one of the partitions is intra-encoded and another of the partitions is intra-encoded, receive block-type syntax information that indicates the size of the block and identifies the partitions and the encoding modes used to encode the partitions, and decode the video block based on the block-type syntax information.

Figure 2:
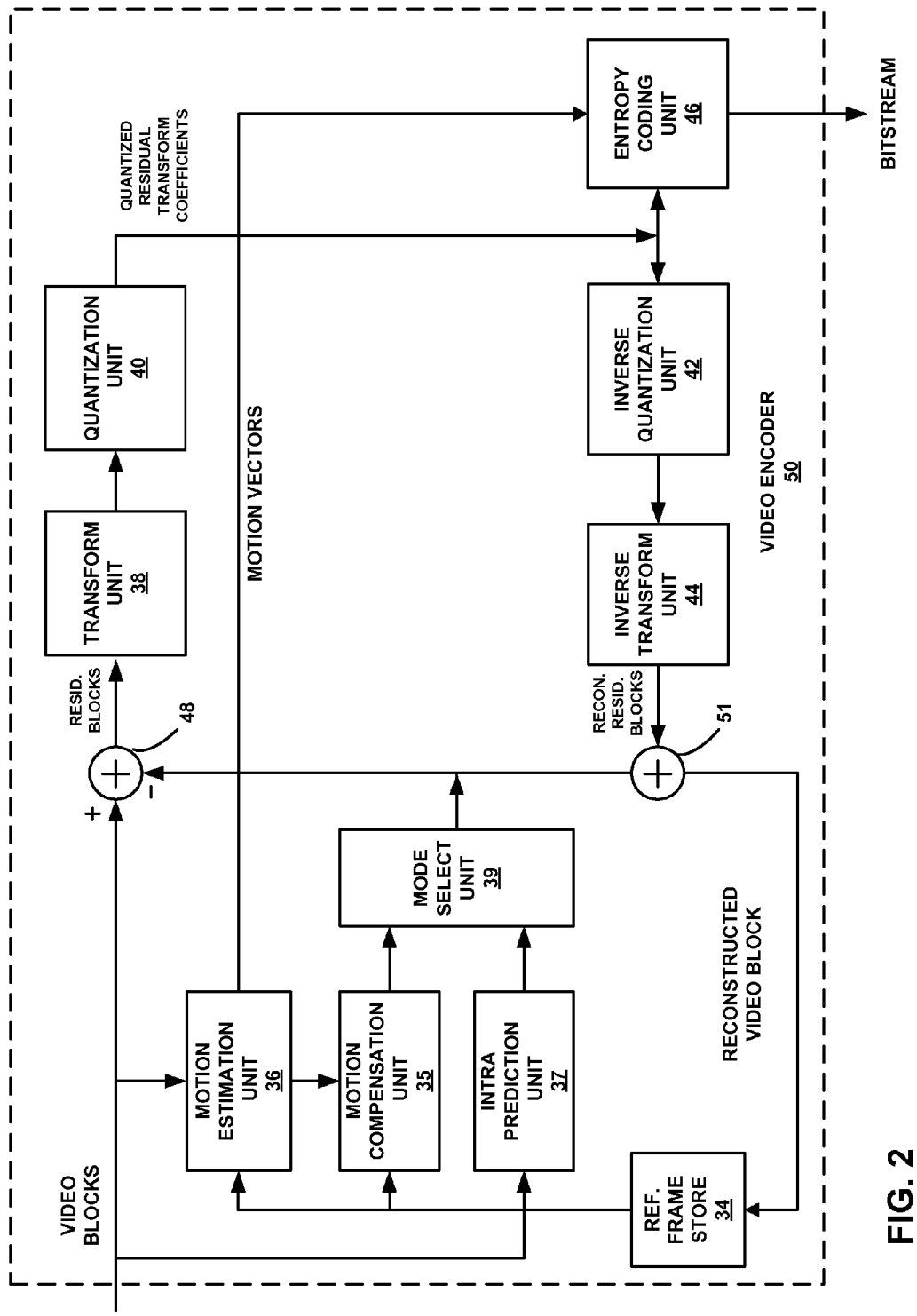
FIG. 2 is a block diagram illustrating an example of a video encoder that implements techniques for coding large macroblocks.

FIG. 2 is a block diagram illustrating an example of a video encoder 50 that may implement techniques for using a large macroblock consistent with this disclosure. Video encoder 50 may correspond to video encoder 20 of source device 12, or a video encoder of a different device. Video encoder 50 may perform intra- and inter-coding of blocks within video frames, including large macroblocks, or partitions or sub-partitions of large macroblocks. Intra-coding relies on spatial prediction to reduce or remove spatial redundancy in video within a given video frame. Inter-coding relies on temporal prediction to reduce or remove temporal redundancy in video within adjacent frames of a video sequence.

Intra-mode (I-mode) may refer to any of several spatial based compression modes and inter-modes such as prediction (P-mode) or bi-directional (B-mode) may refer to any of several temporal-based compression modes. The techniques of this disclosure may be applied both during inter-coding and intra-coding. In some cases, techniques of this disclosure may also be applied to encoding non-video digital pictures. That is, a digital still picture encoder may utilize the techniques of this disclosure to intra-code a digital still picture using large macroblocks in a manner similar to encoding intra-coded macroblocks in video frames in a video sequence.

As shown in FIG. 2, video encoder 50 receives a current video block within a video frame to be encoded. In the example of FIG. 2, video encoder 50 includes motion compensation unit 35, motion estimation unit 36, intra prediction unit 37, mode select unit 39, reference frame store 34, summer 48, transform unit 38, quantization unit 40, and entropy coding unit 46. For video block reconstruction, video encoder 50 also includes inverse quantization unit 42, inverse transform unit 44, and summer 51. A deblocking filter (not shown in FIG. 2) may also be included to filter block boundaries to remove blockiness artifacts from reconstructed video. If desired, the deblocking filter would typically filter the output of summer 51.

During the encoding process, video encoder 50 receives a video frame or slice to be coded. The frame or slice may be divided into multiple video blocks, including large macroblocks. Motion estimation unit 36 and motion compensation unit 35 perform inter-predictive coding of the received video block relative to one or more blocks in one or more reference frames to provide temporal compression. Intra prediction unit 37 performs intra-predictive coding of the received video block relative to one or more neighboring blocks in the same frame or slice as the block to be coded to provide spatial compression.

Mode select unit 39 may select one of the coding modes, intra or inter, e.g., based on error results, and provides the resulting intra- or inter-coded block to summer 48 to generate residual block data and to summer 51 to reconstruct the encoded block for use as a reference frame. In accordance with the techniques of this disclosure, the video block to be coded may comprise a macroblock that is larger than that prescribed by conventional coding standards, i.e., larger than a 16×16 pixel macroblock. For example, the large video block may comprise a 64×64 pixel macroblock or a 32×32 pixel macroblock.

Motion estimation unit 36 and motion compensation unit 35 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics.

A motion vector may also indicate displacement of a partition of a large macroblock. In one example with respect to a 64×64 pixel macroblock with a 32×64 partition and two 32×32 partitions, a first motion vector may indicate displacement of the 32×64 partition, a second motion vector may indicate displacement of a first one of the 32×32 partitions, and a third motion vector may indicate displacement of a second one of the 32×32 partitions, all relative to corresponding partitions in a reference frame. Such partitions may also be considered video blocks, as those terms are used in this disclosure. Motion compensation may involve fetching or generating the predictive block based on the motion vector determined by motion estimation. Again, motion estimation unit 36 and motion compensation unit 35 may be functionally integrated.

Motion estimation unit 36 calculates a motion vector for the video block of an inter-coded frame by comparing the video block to video blocks of a reference frame in reference frame store 34. Motion compensation unit 35 may also interpolate sub-integer pixels of the reference frame, e.g., an I-frame or a P-frame. The ITU H.264 standard refers to reference frames as "lists." Therefore, data stored in reference frame store 34 may also be considered lists. Motion estimation unit 36 compares blocks of one or more reference frames (or lists) from reference frame store 34 to a block to be encoded of a current frame, e.g., a P-frame or a B-frame. When the reference frames in reference frame store 34 include values for sub-integer pixels, a motion vector calculated by motion estimation unit 36 may refer to a sub-integer pixel location of a reference frame. Motion estimation unit 36 sends the calculated motion vector to entropy coding unit 46 and motion compensation unit 35. The reference frame block identified by a motion vector may be referred to as a predictive block. Motion compensation unit 35 calculates error values for the predictive block of the reference frame.

Motion compensation unit 35 may calculate prediction data based on the predictive block. Video encoder 50 forms a residual video block by subtracting the prediction data from motion compensation unit 35 from the original video block being coded. Summer 48 represents the component or components that perform this subtraction operation. Transform unit 38 applies a transform, such as a discrete cosine transform (DCT) or a conceptually similar transform, to the residual block, producing a video block comprising residual transform coefficient values. Transform unit 38 may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel value domain to a transform domain, such as a frequency domain.

Quantization unit 40 quantizes the residual transform coefficients to further reduce bit rate. The quantization process may reduce the bit depth associated with some or all of the coefficients. In one example, quantization unit 40 may establish a different degree of quantization for each 64×64 pixel macroblock according to a luminance quantization parameter, referred to in this disclosure as $QP_Y$. Quantization unit 40 may further modify the luminance quantization parameter used during quantization of a 64×64 macroblock based on a quantization parameter modifier, referred to herein as "MB64_delta_QP," and a previously encoded 64×64 pixel macroblock.

Each 64×64 pixel large macroblock may comprise an individual MB64_delta_QP value, in the range between −26 and +25, inclusive. In general, video encoder 50 may establish the MB64_delta_QP value for a particular block based on a desired bitrate for transmitting the encoded version of the block. The MB64_delta_QP value of a first 64×64 pixel macroblock may be equal to the QP value of a frame or slice that includes the first 64×64 pixel macroblock, e.g., in the frame/slice header. $QP_Y$ for a current 64×64 pixel macroblock may be calculated according to the formula:

$$QP_Y=(QP_{Y,PREV}+MB64\_delta\_QP+52)\%52$$

where $QP_{Y,PREV}$ refers to the $QP_Y$ value of the previous 64×64 pixel macroblock in the decoding order of the current slice/frame, and where "%" refers to the modulo operator such that N %52 returns a result between 0 and 51, inclusive, corresponding to the remainder value of N divided by 52. For a first macroblock in a frame/slice, $QP_{Y,PREV}$ may be set equal to the frame/slice QP sent in the frame/slice header.

In one example, quantization unit 40 presumes that the MB64_delta_QP value is equal to zero when a MB64_delta_QP value is not defined for a particular 64×64 pixel macroblock, including "skip" type macroblocks, such as P_Skip and B_Skip macroblock types. In some examples, additional delta_QP values (generally referred to as quantization parameter modification values) may be defined for finer grain quantization control of partitions within a 64×64 pixel macroblock, such as MB32_delta_QP values for each 32×32 pixel partition of a 64×64 pixel macroblock. In some examples, each partition of a 64×64 macroblock may be assigned an individual quantization parameter. Using an individualized quantization parameter for each partition may result in more efficient quantization of a macroblock, e.g., to better adjust quantization for a non-homogeneous area, instead of using a single QP for a 64×64 macroblock. Each quantization parameter modification value may be included as syntax information with the corresponding encoded block, and a decoder may decode the encoded block by dequantizing, i.e., inverse quantizing, the encoded block according to the quantization parameter modification value.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding technique. Following the entropy coding by entropy coding unit 46, the encoded video may be transmitted to another device or archived for later transmission or retrieval. The coded bitstream may include entropy coded residual transform coefficient blocks, motion vectors for such blocks, MB64_delta_QP values for each 64×64 pixel macroblock, and other syntax elements including, for example, macroblock-type identifier values, coded unit headers indicating the maximum size of macroblocks in the coded unit, $QP_Y$ values, coded block pattern (CBP) values, values that identify a partitioning method of a macroblock or sub-block, and transform size flag values, as discussed in greater detail below. In the case of context adaptive binary arithmetic coding, context may be based on neighboring macroblocks.

In some cases, entropy coding unit 46 or another unit of video encoder 50 may be configured to perform other coding functions, in addition to entropy coding. For example, entropy coding unit 46 may be configured to determine the CBP values for the large macroblocks and partitions. Entropy coding unit 46 may apply a hierarchical CBP scheme to provide a CBP value for a large macroblock that indicates whether any partitions in the macroblock include non-zero transform coefficient values and, if so, other CBP values to indicate whether particular partitions within the large macroblock have non-zero transform coefficient values. Also, in some cases, entropy coding unit 46 may perform run length coding of the coefficients in a large macroblock or subpartition. In particular, entropy coding unit 46 may apply a zig-zag scan or other scan pattern to scan the transform coefficients in a macroblock or partition and encode runs of zeros for further compression. Entropy coding unit 46 also may construct header information with appropriate syntax elements for transmission in the encoded video bitstream.

Inverse quantization unit 42 and inverse transform unit 44 apply inverse quantization and inverse transformation, respectively, to reconstruct the residual block in the pixel domain, e.g., for later use as a reference block. Motion compensation unit 35 may calculate a reference block by adding the residual block to a predictive block of one of the frames of reference frame store 34. Motion compensation unit 35 may also apply one or more interpolation filters to the reconstructed residual block to calculate sub-integer pixel values. Summer 51 adds the reconstructed residual block to the motion compensated prediction block produced by motion compensation unit 35 to produce a reconstructed video block for storage in reference frame store 34. The reconstructed video block may be used by motion estimation unit 36 and motion compensation unit 35 as a reference block to intercode a block in a subsequent video frame. The large macroblock may comprise a 64×64 pixel macroblock, a 32×32 pixel macroblock, or other macroblock that is larger than the size prescribed by conventional video coding standards.

Figure 3:
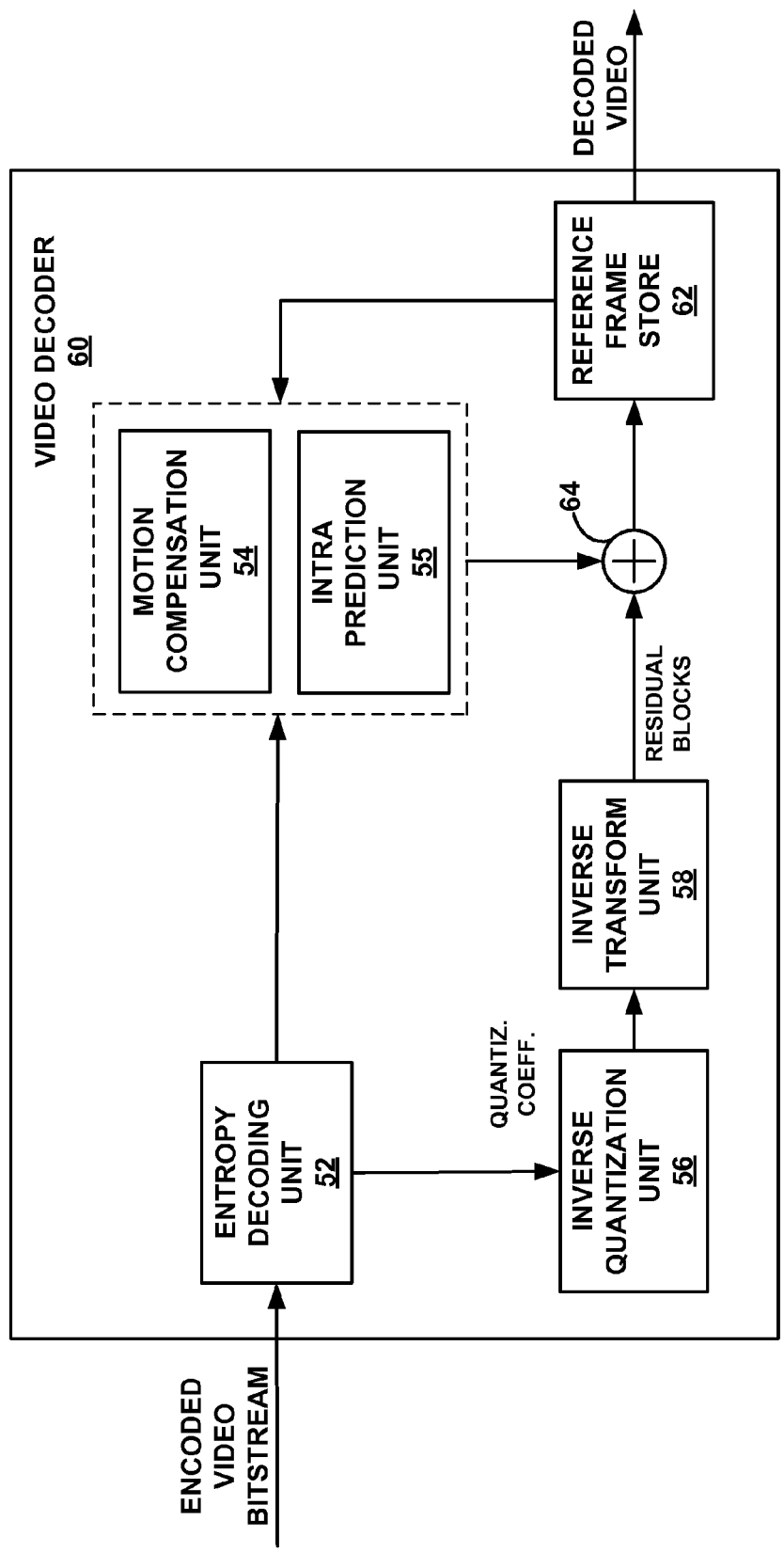
FIG. 3 is a block diagram illustrating an example of a video decoder that implements techniques for coding large macroblocks.

FIG. 3 is a block diagram illustrating an example of a video decoder 60, which decodes a video sequence that is encoded in the manner described in this disclosure. The encoded video sequence may include encoded macroblocks that are larger than the size prescribed by conventional video encoding standards. For example, the encoded macroblocks may be 32×32 pixel or 64×64 pixel macroblocks. In the example of FIG. 3, video decoder 60 includes an entropy decoding unit 52, motion compensation unit 54, intra prediction unit 55, inverse quantization unit 56, inverse transformation unit 58, reference frame store 62 and summer 64. Video decoder 60 may, in some examples, perform a decoding pass generally reciprocal to the encoding pass described with respect to video encoder 50 (FIG. 2). Motion compensation unit 54 may generate prediction data based on motion vectors received from entropy decoding unit 52.

Entropy decoding unit 52 entropy-decodes the received bitstream to generate quantized coefficients and syntax elements (e.g., motion vectors, CBP values, $QP_Y$ values, transform size flag values, MB64_delta_QP values). Entropy decoding unit 52 may parse the bitstream to identify syntax information in coded units such as frames, slices and/or macroblock headers. Syntax information for a coded unit comprising a plurality of macroblocks may indicate the maximum size of the macroblocks, e.g., 16×16 pixels, 32×32 pixels, 64×64 pixels, or other larger sized macroblocks in the coded unit. The syntax information for a block is forwarded from entropy coding unit 52 to either motion compensation unit 54 or intra-prediction unit 55, e.g., depending on the coding mode of the block. A decoder may use the maximum size indicator in the syntax of a coded unit to select a syntax decoder for the coded unit. Using the syntax decoder specified for the maximum size, the decoder can then properly interpret and process the large-sized macroblocks include in the coded unit.

Motion compensation unit 54 may use motion vectors received in the bitstream to identify a prediction block in reference frames in reference frame store 62. Intra prediction unit 55 may use intra prediction modes received in the bitstream to form a prediction block from spatially adjacent blocks. Inverse quantization unit 56 inverse quantizes, i.e., de-quantizes, the quantized block coefficients provided in the bitstream and decoded by entropy decoding unit 52. The inverse quantization process may include a conventional process, e.g., as defined by the H.264 decoding standard. The inverse quantization process may also include use of a quantization parameter $QP_Y$ calculated by encoder 50 for each 64×64 macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 54 produces motion compensated blocks, possibly performing interpolation based on interpolation filters. Identifiers for interpolation filters to be used for motion estimation with sub-pixel precision may be included in the syntax elements. Motion compensation unit 54 may use interpolation filters as used by video encoder 50 during encoding of the video block to calculate interpolated values for sub-integer pixels of a reference block. Motion compensation unit 54 may determine the interpolation filters used by video encoder 50 according to received syntax information and use the interpolation filters to produce predictive blocks.

Motion compensation unit 54 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (or lists) for each inter-encoded macroblock or partition, and other information to decode the encoded video sequence.

Summer 64 sums the residual blocks with the corresponding prediction blocks generated by motion compensation unit 54 or intra-prediction unit to form decoded blocks. If desired, a deblocking filter may also be applied to filter the decoded blocks in order to remove blockiness artifacts. The decoded video blocks are then stored in reference frame store 62, which provides reference blocks for subsequent motion compensation and also produces decoded video for presentation on a display device (such as device 32 of FIG. 1). The decoded video blocks may each comprise a 64×64 pixel macroblock, 32×32 pixel macroblock, or other larger-than-standard macroblock. Some macroblocks may include partitions with a variety of different partition sizes.

Figure 4A:
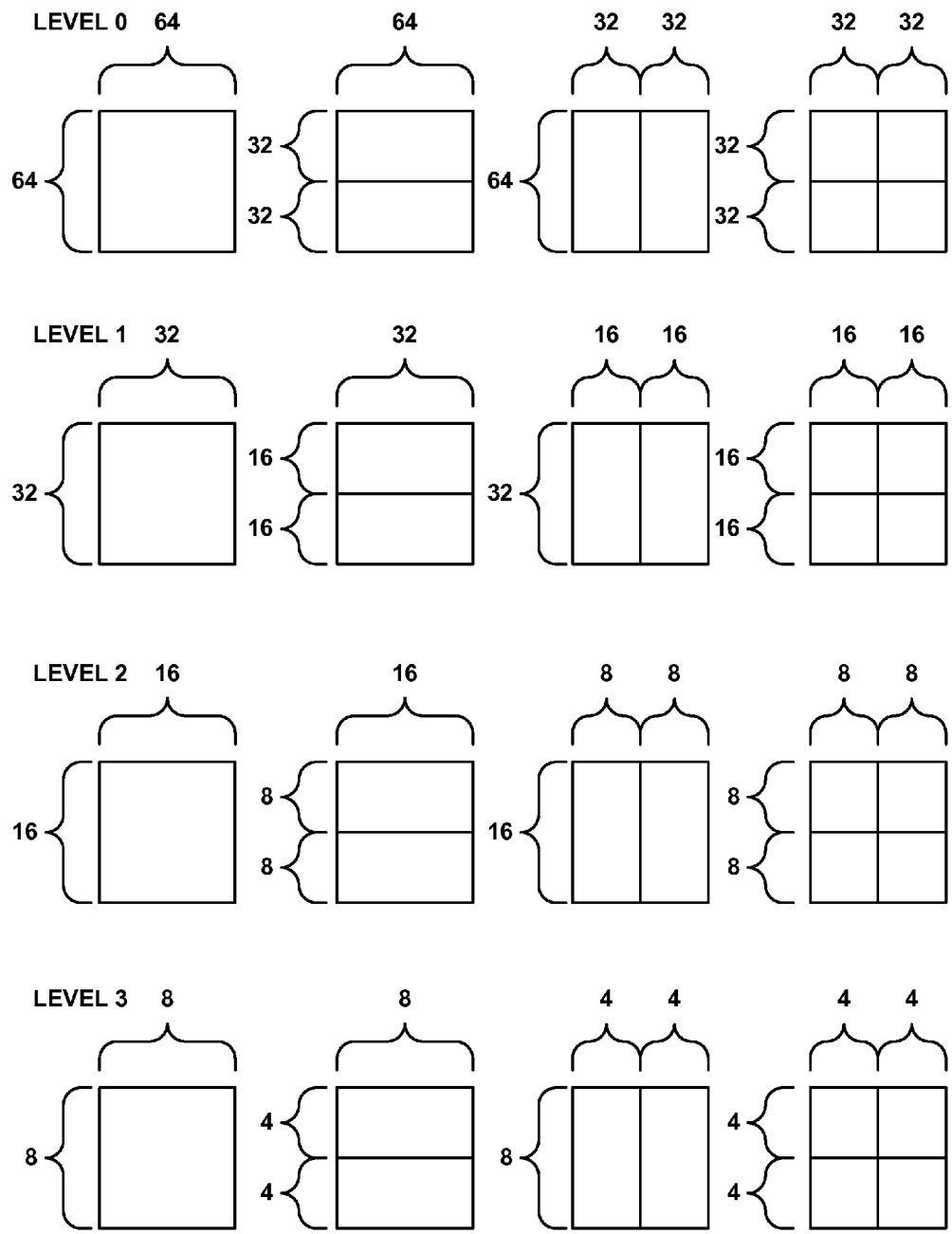
FIG. 4A is a conceptual diagram illustrating partitioning among various levels of a large macroblock.

FIG. 4A is a conceptual diagram illustrating example partitioning among various partition levels of a large macroblock. Blocks of each partition level include a number of pixels corresponding to the particular level. Four partitioning patterns are also shown for each level, where a first partition pattern includes the whole block, a second partition pattern includes two horizontal partitions of equal size, a third partition pattern includes two vertical partitions of equal size, and a fourth partition pattern includes four equally-sized partitions. One of the partitioning patterns may be chosen for each partition at each partition level.

In the example of FIG. 4A, level 0 corresponds to a 64×64 pixel macroblock partition of luma samples and associated chroma samples. Level 1 corresponds to a 32×32 pixel block of luma samples and associated chroma samples. Level 2 corresponds to a 16×16 pixel block of luma samples and associated chroma samples, and level 3 corresponds to an 8×8 pixel block of luma samples and associated chroma samples.

In other examples, additional levels could be introduced to utilize larger or smaller numbers of pixels. For example, level 0 could begin with a 128×128 pixel macroblock, a 256×256 pixel macroblock, or other larger-sized macroblock. The highest-numbered level, in some examples, could be as fine-grain as a single pixel, i.e., a 1×1 block. Hence, from the lowest to highest levels, partitioning may be increasingly sub-partitioned, such that the macroblock is partitioned, partitions are further partitioned, further partitions are still further partitioned, and so forth. In some instances, partitions below level 0, i.e., partitions of partitions, may be referred to as sub-partitions.

When a block at one level is partitioned using four equally-sized sub-blocks, any or all of the sub-blocks may be partitioned according to the partition patterns of the next level. That is, for an N×N block that has been partitioned at level x into four equally sized sub-blocks (N/2)×(N/2), any of the (N/2)×(N/2) sub-blocks can be further partitioned according to any of the partition patterns of level x+1. Thus, a 32×32 pixel sub-block of a 64×64 pixel macroblock at level 0 can be further partitioned according to any of the patterns shown in FIG. 4A at level 1, e.g., 32×32, 32×16 and 32×16, 16×32 and 16×32, or 16×16, 16×16, 16×16 and 16×16. Likewise, where four 16×16 pixel sub-blocks result from a 32×32 pixel sub-block being partitioned, each of the 16×16 pixel sub-blocks can be further partitioned according to any of the patterns shown in FIG. 4A at level 2. Where four 8×8 pixel sub-blocks result from a 16×16 pixel sub-block being partitioned, each of the 8×8 pixel sub-blocks can be further partitioned according to any of the patterns shown in FIG. 4A at level 3.

Using the example four levels of partitions shown in FIG. 4A, large homogeneous areas and fine sporadic changes can be adaptively represented by an encoder implementing the framework and techniques of this disclosure. For example, video encoder 50 may determine different partitioning levels for different macroblocks, as well as coding modes to apply to such partitions, e.g., based on rate-distortion analysis. Also, as described in greater detail below, video encoder 50 may encode at least some of the final partitions differently, using spatial (P-encoded or B-encoded) or temporal (I-encoded) prediction, e.g., based on rate-distortion metric results or other considerations.

Instead of coding a large macroblock uniformly such that all partitions have the same intra- or inter-coding mode, a large macroblock may be coded such that some partitions have different coding mode. For example, some (at least one) partitions may be coded with different intra-coding modes (e.g., I_16×16, I_8×8, I_4×4) relative to other (at least one) partitions in the same macroblock. Also, some (at least one) partitions may be intra-coded while other (at least one) partitions in the same macroblock are inter-coded.

For example, video encoder 50 may, for a 32×32 block with four 16×16 partitions, encode some of the 16×16 partitions using spatial prediction and other 16×16 partitions using temporal prediction. As another example, video encoder 50 may, for a 32×32 block with four 16×16 partitions, encode one or more of the 16×16 partitions using a first prediction mode (e.g., one of I_16×16, I_8×8, I_4×4) and one or more other 16×16 partitions using a different spatial prediction mode (e.g., one of I_16×16, I_8×8, I_4×4).

Figure 4B:
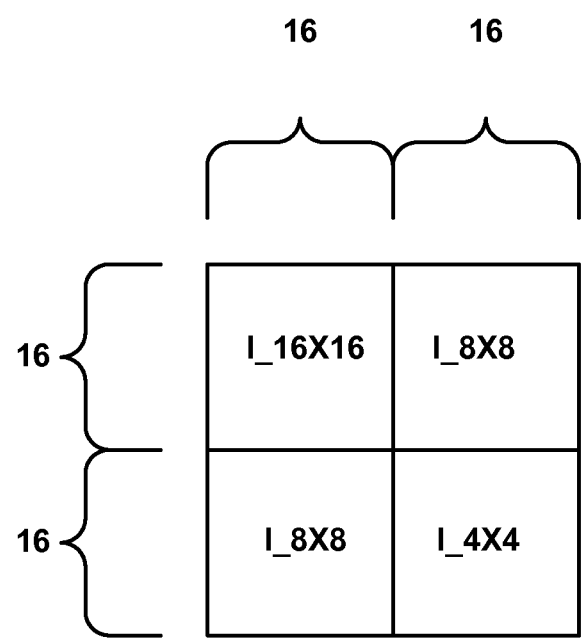
FIG. 4B is a conceptual diagram illustrating assignment of different coding modes to different partitions a large macroblock.

FIG. 4B is a conceptual diagram illustrating assignment of different coding modes to different partitions a large macroblock. In particular, FIG. 4B illustrates assignment of an I_16×16 intra-coding mode to an upper left 16×16 block of a large 32×32 macroblock, I_8×8 intra-coding modes to upper right and lower left 16×16 blocks of the large 32×32 macroblock, and an I_4×4 intra-coding mode to a lower right 16×16 block of the large 32×32 macroblock. In some cases, the coding modes illustrated in FIG. 4B may be H.264 intra-coding modes for luma coding.

In the manner described, each partition can be further partitioned on a selective basis, and each final partition can be selectively coded using either temporal prediction or spatial prediction, and using selected temporal or spatial coding modes. Consequently, it is possible to code a large macroblock with mixed modes such that some partitions in the macroblock are intra-coded and other partitions in the same macroblock are inter-coded, or some partitions in the same macroblock are coded with different intra-coding modes or different inter-coding modes.

Video encoder 50 may further define each partition according to a macroblock type. The macroblock type may be included as a syntax element in an encoded bitstream, e.g., as a syntax element in a macroblock header. In general, the macroblock type may be used to identify how the macroblock is partitioned, and the respective methods or modes for encoding each of the partitions of the macroblock, as discussed above. Methods for encoding the partitions may include not only intra- and inter-coding, but also particular modes of intra-coding (e.g., I_16×16, I_8×8, I_4×4) or inter-coding (e.g., P_or B_16×16, 16×8, 8×16, 8×8, 8×4, 4×8 and 4×4).

As discussed with respect to the example of Table 1 below in greater detail for P-blocks and with respect to the example of Table 2 below for B-blocks, partition level 0 blocks may be defined according to an MB64_type syntax element, representative of a macroblock with 64×64 pixels. Similar type definitions may be formed for any MB[N]_type, where [N] refers to a block with N×N pixels, where N is a positive integer that may be greater than 16. When an N×N block has four partitions of size (N/2)×(N/2), as shown in the last column on FIG. 4A, each of the four partitions may receive their own type definitions, e.g., MB[N/2]_type. For example, for a 64×64 pixel block (of type MB64_type) with four 32×32 pixel partitions, video encoder 50 may introduce an MB32_type for each of the four 32×32 pixel partitions. These macroblock type syntax elements may assist decoder 60 in decoding large macroblocks and various partitions of large macroblocks, as described in this disclosure. Each N×N pixel macroblock where N is greater than 16 generally corresponds to a unique type definition. Accordingly, the encoder may generate syntax appropriate for the particular macroblock and indicate to the decoder the maximum size of macroblocks in a coded unit, such as a frame, slice, or sequence of macroblocks. In this manner, the decoder may receive an indication of a syntax decoder to apply to macroblocks of the coded unit. This also ensures that the decoder may be backwards-compatible with existing coding standards, such as H.264, in that the encoder may indicate the type of syntax decoders to apply to the macroblocks, e.g., standard H.264 or those specified for processing of larger macroblocks according to the techniques of this disclosure.

In general, each MB[N]_type definition may represent, for a corresponding type, a number of pixels in a block of the corresponding type (e.g., 64×64), a reference frame (or reference list) for the block, a number of partitions for the block, the size of each partition of the block, how each partition is encoded (e.g., intra or inter and particular modes), and the reference frame (or reference list) for each partition of the block when the partition is inter-coded. For 16×16 and smaller blocks, video encoder 50 may, in some examples, use conventional type definitions as the types of the blocks, such as types specified by the H.264 standard. In other examples, video encoder 50 may apply newly defined block types for 16×16 and smaller blocks.

Video encoder 50 may evaluate both conventional inter- or intra-coding methods using normal macroblock sizes and partitions, such as methods prescribed by ITU H.264, and inter- or intra-coding methods using the larger macroblocks and partitions described by this disclosure, and compare the rate-distortion characteristics of each approach to determine which method results in the best rate-distortion performance. Video encoder 50 then may select, and apply to the block to be coded, the best coding approach, including inter- or intra-mode, macroblock size (large, larger or normal), and partitioning, based on optimal or acceptable rate-distortion results for the coding approach. As an illustration, video encoder 50 may select the use of 64×64 macroblocks, 32×32 macroblocks or 16×16 macroblocks to encode a particular frame or slice based on rate-distortion results produced when the video encoder uses such macroblock sizes.

In general, two different approaches may be used to design intra modes using large macroblocks. As one example, during intra-coding, spatial prediction may be performed for a block based on neighboring blocks directly. In accordance with the techniques of this disclosure, video encoder 50 may generate spatial predictive 32×32 blocks based on their neighboring pixels directly and generate spatial predictive 64×64 blocks based on their neighboring pixels directly. In this manner, spatial prediction may be performed at a larger scale compared to 16×16 intra blocks. Therefore, these techniques may, in some examples, result in some bit rate savings, e.g., with a smaller number of blocks or partitions per frame or slice.

As another example, video encoder 50 may group four N×N blocks together to generate an (N*2)×(N*2) block, and then encode the (N*2)×(N*2) block. Using existing H.264 intra-coding modes, video encoder 50 may group four intra-coded blocks together, thereby forming a large intra-coded macroblock. For example, four intra-coded blocks, each having a size of 16×16, can be grouped together to form a large, 32×32 intra-coded block. Video encoder 50 may encode each of the four corresponding N×N blocks using a different encoding mode, e.g., I_16×16, I_8×8, or I_4×4 according to H.264. In this manner, each 16×16 block can be assigned its own mode of spatial prediction by video encoder 50, e.g., to promote favorable encoding results.

Video encoder 50 may design intra modes according to either of the two different methods discussed above, and analyze the different methods to determine which approach provides better encoding results. For example, video encoder 50 may apply the different intra mode approaches, and place them in a single candidate pool to allow them to compete with each other for the best rate-distortion performance. Using a rate-distortion comparison between the different approaches, video encoder 50 can determine how to encode each partition and/or macroblock. In particular, video encoder 50 may select the coding modes that produce the best rate-distortion performance for a given macroblock, and apply those coding modes to encode the macroblock.

Figure 5:
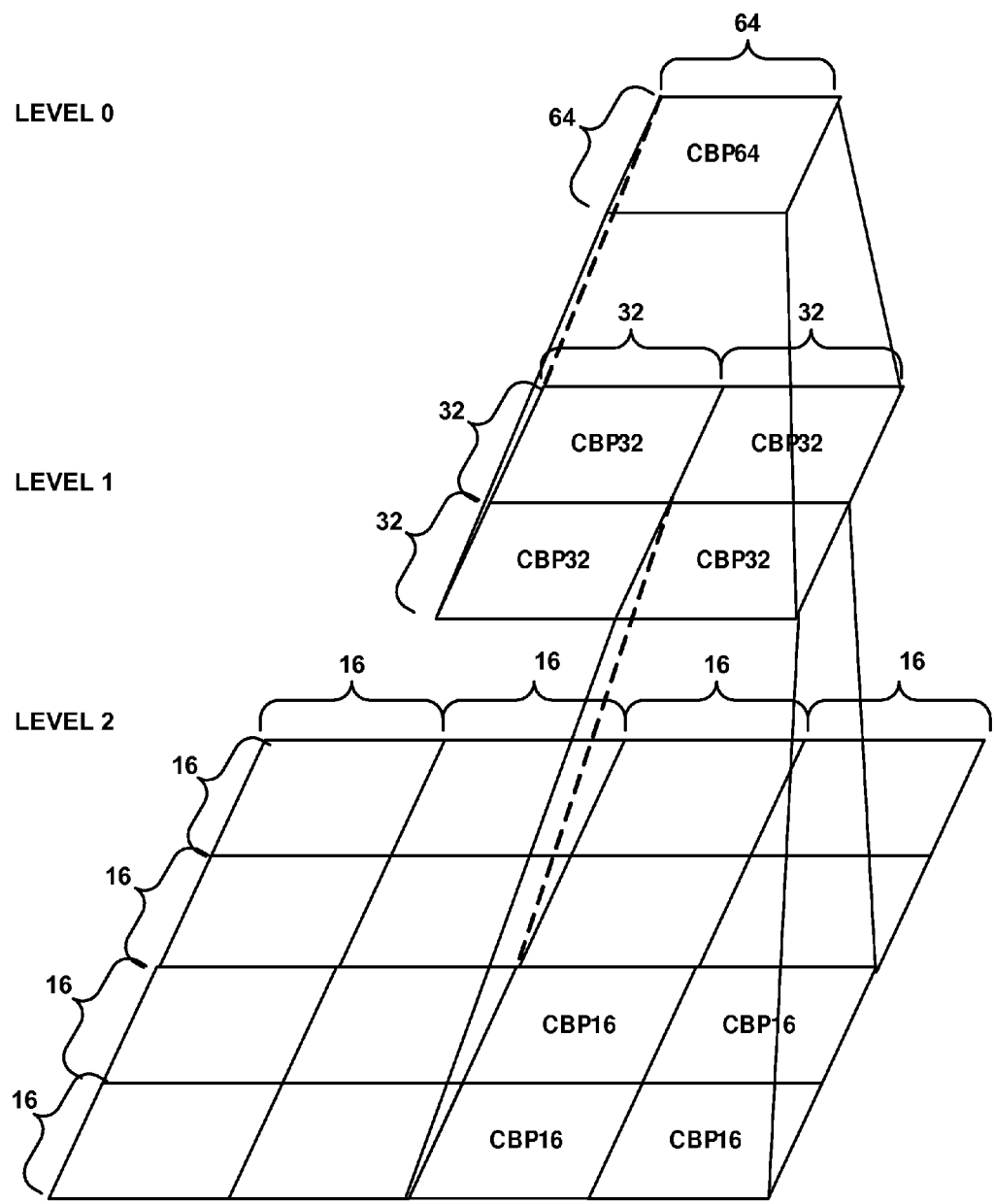
FIG. 5 is a conceptual diagram illustrating a hierarchical view of various levels of a large macroblock.

FIG. 5 is a conceptual diagram illustrating a hierarchical view of various partition levels of a large macroblock. FIG. 5 also represents the relationships between various partition levels of a large macroblock as described with respect to FIG. 4A. Each block of a partition level, as illustrated in the example of FIG. 5, may have a corresponding coded block pattern (CBP) value. The CBP values form part of the syntax information that describes a block or macroblock. In one example, the CBP values are each one-bit syntax values that indicate whether or not there are any nonzero transform coefficient values in a given block following transform and quantization operations.

In some cases, a prediction block may be very close in pixel content to a block to be coded such that all of the residual transform coefficients are quantized to zero, in which case there may be no need to transmit transform coefficients for the coded block. Instead, the CBP value for the block may be set to zero to indicate that the coded block includes no non-zero coefficients. Alternatively, if a block includes at least one non-zero coefficient, the CBP value may be set to one. Decoder 60 may use CBP values to identify residual blocks that are coded, i.e., with one or more non-zero transform coefficients, versus blocks that are not coded, i.e., including no non-zero transform coefficients.

In accordance with some of the techniques described in this disclosure, an encoder may assign CBP values to large macroblocks hierarchically based on whether those macroblocks, including their partitions, have at least one non-zero coefficient, and assign CBP values to the partitions to indicate which partitions have non-zero coefficients. Hierarchical CBP for large macroblocks can facilitate processing of large macroblocks to quickly identify coded large macroblocks and uncoded large macroblocks, and permit identification of coded partitions at each partition level for the large macroblock to determine whether it is necessary to use residual data to decode the blocks.

In one example, a 64×64 pixel macroblock at level zero may include syntax information comprising a CBP64 value, e.g., a one-bit value, to indicate whether the entire 64×64 pixel macroblock, including any partitions, has non-zero coefficients or not. In one example, video encoder 50 "sets" the CBP64 bit, e.g., to a value of "1," to represent that the 64×64 pixel macroblock includes at least one non-zero coefficient. Thus, when the CBP64 value is set, e.g., to a value of "1," the 64×64 pixel macroblock includes at least one non-zero coefficient somewhere in the macroblock. In another example, video encoder 50 "clears" the CBP64 value, e.g., to a value of "0," to represent that the 64×64 pixel macroblock has all zero coefficients. Thus, when the CBP64 value is cleared, e.g., to a value of "0," the 64×64 pixel macroblock is indicated as having all zero coefficients. Macroblocks with CBP64 values of "0" do not generally require transmission of residual data in the bitstream, whereas macroblocks with CBP64 values of "1" generally require transmission of residual data in the bitstream for use in decoding such macroblocks.

A 64×64 pixel macroblock that has all zero coefficients need not include CBP values for partitions or sub-blocks thereof. That is, because the 64×64 pixel macroblock has all zero coefficients, each of the partitions also necessarily has all zero coefficients. On the contrary, a 64×64 pixel macroblock that includes at least one non-zero coefficient may further include CBP values for the partitions at the next partition level. For example, a CBP64 with a value of one may include additional syntax information in the form of a one-bit value CBP32 for each 32×32 partition of the 64×64 block. That is, in one example, each 32×32 pixel partition (such as the four partition blocks of level 1 in FIG. 5) of a 64×64 pixel macroblock is assigned a CBP32 value as part of the syntax information of the 64×64 pixel macroblock. As with the CBP64 value, each CBP32 value may comprise a bit that is set to a value of one when the corresponding 32×32 pixel block has at least one non-zero coefficient and that is cleared to a value of zero when the corresponding 32×32 pixel block has all zero coefficients. The encoder may further indicate, in syntax of a coded unit comprising a plurality of macroblocks, such as a frame, slice, or sequence, the maximum size of a macroblock in the coded unit, to indicate to the decoder how to interpret the syntax information of each macroblock, e.g., which syntax decoder to use for processing of macroblocks in the coded unit.

In this manner, a 64×64 pixel macroblock that has all zero coefficients may use a single bit to represent the fact that the macroblock has all zero coefficients, whereas a 64×64 pixel macroblock with at least one non-zero coefficient may include CBP syntax information comprising at least five bits, a first bit to represent that the 64×64 pixel macroblock has a non-zero coefficient and four additional bits, each representative of whether a corresponding one of four 32×32 pixel partitions of the macroblock includes at least one non-zero coefficient. In some examples, when the first three of the four additional bits are zero, the fourth additional bit may not be included, which the decoder may interpret as the last partition being one. That is, the encoder may determine that the last bit has a value of one when the first three bits are zero and when the bit representative of the higher level hierarchy has a value of one. For example, a prefix of a CBP64 value of "10001" may be shortened to "1000," as the first bit indicates that at least one of the four partitions has non-zero coefficients, and the next three zeros indicate that the first three partitions have all zero coefficients. Therefore, a decoder may deduce that it is the last partition that includes a non-zero coefficient, without the explicit bit informing the decoder of this fact, e.g., from the bit string "1000." That is, the decoder may interpret the CBP64 prefix "1000" as "10001."

Likewise, a one-bit CBP32 may be set to a value of "1" when the 32×32 pixel partition includes at least one non-zero coefficient, and to a value of "0" when all of the coefficients have a value of zero. If a 32×32 pixel partition has a CBP value of 1, then partitions of that 32×32 partition at the next partition level may be assigned CBP values to indicate whether the respective partitions include any non-zero coefficients. Hence, the CBP values may be assigned in a hierarchical manner at each partition level until there are no further partition levels or no partitions including non-zero coefficients.

In the above manner, encoders and/or decoders may utilize hierarchical CBP values to represent whether a large macroblock (e.g., 64×64 or 32×32) and partitions thereof include at least one non-zero coefficient or all zero coefficients. Accordingly, an encoder may encode a large macroblock of a coded unit of a digital video stream, such that the macroblock block comprises greater than 16×16 pixels, generate block-type syntax information that identifies the size of the block, generate a CBP value for the block, such that the CBP value identifies whether the block includes at least one non-zero coefficient, and generate additional CBP values for various partition levels of the block, if applicable.

In one example, the hierarchical CBP values may comprise an array of bits (e.g., a bit vector) whose length depends on the values of the prefix. The array may further represent a hierarchy of CBP values, such as a tree structure, as shown in FIG. 5. The array may represent nodes of the tree in a breadth-first manner, where each node corresponds to a bit in the array. When a note of the tree has a bit that is set to "1," in one example, the node has four branches (corresponding to the four partitions), and when the bit is cleared to "0," the node has no branches.

In this example, to identify the values of the nodes that branch from a particular node X, an encoder and/or a decoder may determine the four consecutive bits starting at node Y that represent the nodes that branch from node x by calculating:

$$y = \left(4 * \sum_{i=0}^{x} \text{tree}[i]\right) - 3$$

where tree[ ] corresponds to the array of bits with a starting index of 0, i is an integer index into the array tree[ ], x corresponds to the index of node X in tree[ ], and y corresponds to the index of node Y that is the first branch-node of node X. The three subsequent array positions (i.e., y+1, y+2, and y+3) correspond to the other branch-nodes of node X.

An encoder, such as video encoder 50 (FIG. 2), may assign CBP values for 16×16 pixel partitions of the 32×32 pixel partitions with at least one non-zero coefficient using existing methods, such as methods prescribed by ITU H.264 for setting CBP values for 16×16 blocks, as part of the syntax of the 64×64 pixel macroblock. The encoder may also select CBP values for the partitions of the 32×32 pixel partitions that have at least one non-zero coefficient based on the size of the partitions, a type of block corresponding to the partitions (e.g., chroma block or luma block), or other characteristics of the partitions. Example methods for setting a CBP value of a partition of a 32×32 pixel partition are discussed in further detail with respect to FIGS. 8 and 9.

FIGS. 6-9 are flowcharts illustrating example methods for setting various coded block pattern (CBP) values in accordance with the techniques of this disclosure. Although the example methods of FIGS. 6-9 are discussed with respect to a 64×64 pixel macroblock, it should be understood that similar techniques may apply for assigning hierarchical CBP values for other sizes of macroblocks. Although the examples of FIGS. 6-9 are discussed with respect to video encoder 50 (FIG. 2), it should be understood that other encoders may employ similar methods to assign CBP values to larger-than-standard macroblocks. Likewise, decoders may utilize similar, albeit reciprocal, methods for interpreting the meaning of a particular CBP value for a macroblock. For example, if an inter-coded macroblock received in the bitstream has a CBP value of "0," the decoder may receive no residual data for the macroblock and may simply produce a predictive block identified by a motion vector as the decoded macroblock, or a group of predictive blocks identified by motion vectors with respect to partitions of the macroblock.

Figure 6:
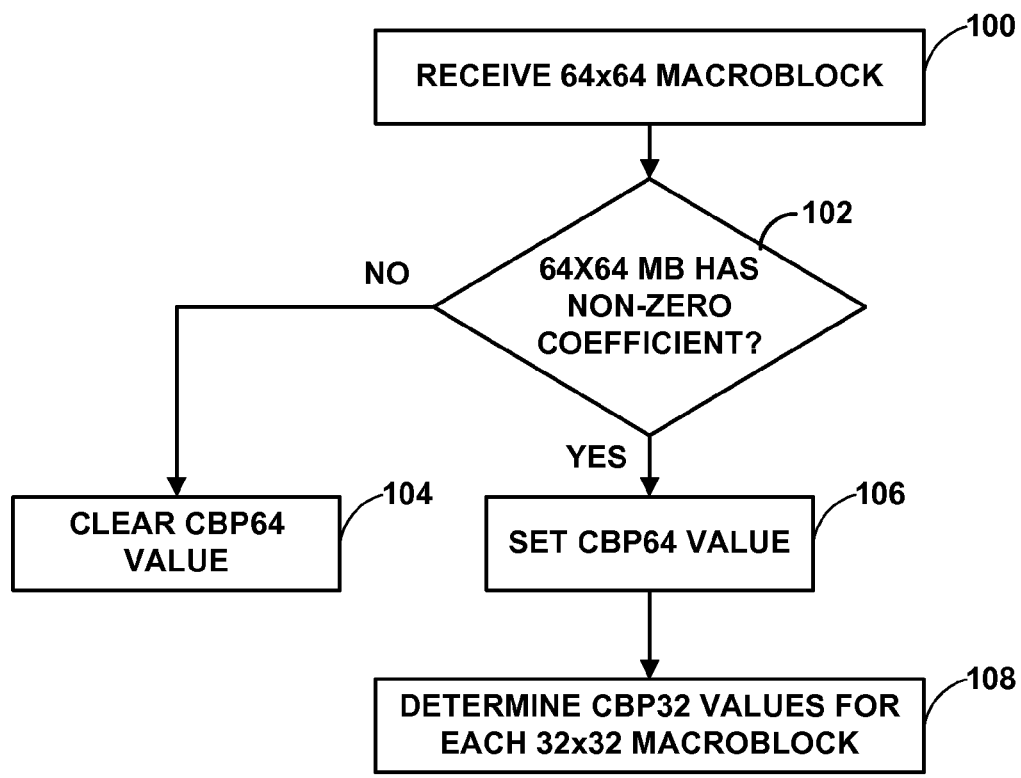
FIG. 6 is a flowchart illustrating an example method for setting a coded block pattern (CBP) value of a 64×64 pixel large macroblock.

FIG. 6 is a flowchart illustrating an example method for setting a CBP64 value of an example 64×64 pixel macroblock. Similar methods may be applied for macroblocks larger than 64×64. Initially, video encoder 50 receives a 64×64 pixel macroblock (100). Motion estimation unit 36 and motion compensation unit 35 may then generate one or more motion vectors and one or more residual blocks to encode the macroblock, respectively. The output of transform unit 38 generally comprises an array of residual transform coefficient values for an intra-coded block or a residual block of an inter-coded block, which array is quantized by quantization unit 40 to produce a series of quantized transform coefficients.

Entropy coding unit 46 may provide entropy coding and other coding functions separate from entropy coding. For example, in addition to CAVLC, CABAC, or other entropy coding functions, entropy coding unit 46 or another unit of video encoder 50 may determine CBP values for the large macroblocks and partitions. In particular, entropy coding unit 46 may determine the CBP64 value for a 64×64 pixel macroblock by first determining whether the macroblock has at least one non-zero, quantized transform coefficient (102). When entropy coding unit 46 determines that all of the transform coefficients have a value of zero ("NO" branch of 102), entropy coding unit 46 clears the CBP64 value for the 64×64 macroblock, e.g., resets a bit for the CBP64 value to "0" (104). When entropy coding unit 46 identifies at least one non-zero coefficient ("YES" branch of 102) for the 64×65 macroblock, entropy coding unit 46 sets the CBP64 value, e.g., sets a bit for the CBP64 value to "1" (106).

When the macroblock has all zero coefficients, entropy coding unit 46 does not need to establish any additional CBP values for the partitions of the macroblock, which may reduce overhead. In one example, when the macroblock has at least one non-zero coefficient, however, entropy coding unit 46 proceeds to determine CBP values for each of the four 32×32 pixel partitions of the 64×64 pixel macroblock (108). Entropy coding unit 46 may utilize the method described with respect to FIG. 7 four times, once for each of the four partitions, to establish four CBP32 values, each corresponding to a different one of the four 32×32 pixel partitions of the 64×64 macroblock. In this manner, when a macroblock has all zero coefficients, entropy coding unit 46 may transmit a single bit with a value of "0" to indicate that the macroblock has all zero coefficients, whereas when the macroblock has at least one non-zero coefficient, entropy coding unit 46 may transmit five bits, one bit for the macroblock and four bits, each corresponding to one of the four partitions of the macroblock. In addition, when a partition includes at least one non-zero coefficient, residual data for the partition may be sent in the encoded bitstream. As with the example of the CBP64 discussed above, when the first three of the four additional bits are zero, the fourth additional bit may not be necessary, because the decoder may determine that it has a value of one. Thus in some examples, the encoder may only send three zeros, i.e., "000," rather than three zeros and a one, i.e., "0001."

Figure 7:
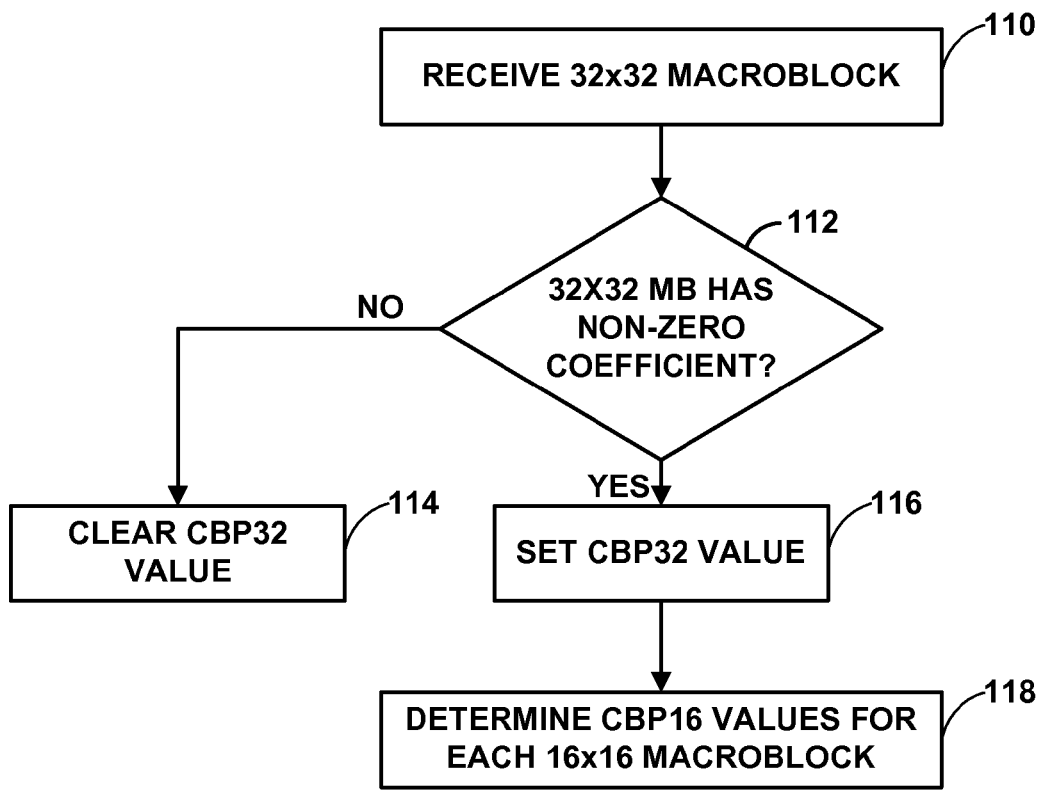
FIG. 7 is a flowchart illustrating an example method for setting a CBP value of a 32×32 pixel partition of a 64×64 pixel large macroblock.

FIG. 7 is a flowchart illustrating an example method for setting a CBP32 value of a 32×32 pixel partition of a 64×64 pixel macroblock. Initially, for the next partition level, entropy coding unit 46 receives a 32×32 pixel partition of the macroblock (110), e.g., one of the four partitions referred to with respect to FIG. 6. Entropy coding unit 46 then determines a CBP32 value for the 32×32 pixel partition by first determining whether the partition includes at least one non-zero coefficient (112). When entropy coding unit 46 determines that all of the coefficients for the partition have a value of zero ("NO" branch of 112), entropy coding unit 46 clears the CBP32 value, e.g., resets a bit for the CBP32 value to "0" (114). When entropy coding unit 46 identifies at least one non-zero coefficient of the partition ("YES" branch of 112), entropy coding unit 46 sets the CBP32 value, e.g., sets a bit for the CBP32 value to a value of "1" (116).

In one example, when the partition has all zero coefficients, entropy coding unit 46 does not establish any additional CBP values for the partition. When a partition includes at least one non-zero coefficient, however, entropy coding unit 46 determines CBP values for each of the four 16×16 pixel partitions of the 32×32 pixel partition of the macroblock. Entropy coding unit 46 may utilize the method described with respect to FIG. 8 to establish four CBP16 values each corresponding to one of the four 16×16 pixel partitions.

In this manner, when a partition has all zero coefficients, entropy coding unit 46 may set a bit with a value of "0" to indicate that the partition has all zero coefficients, whereas when the partition has at least one non-zero coefficient, entropy coding unit 46 may include five bits, one bit for the partition and four bits each corresponding to a different one of the four sub-partitions of the partition of the macroblock. Hence, each additional partition level may present four additional CBP bits when the partition in the preceding partition level had at least one nonzero transform coefficient value. As one example, if a 64×64 macroblock has a CBP value of 1, and four 32×32 partitions have CBP values of 1, 0, 1 and 1, respectively, the overall CBP value up to that point is 11011. Additional CBP bits may be added for additional partitions of the 32×32 partitions, e.g., into 16×16 partitions.

Figure 8:
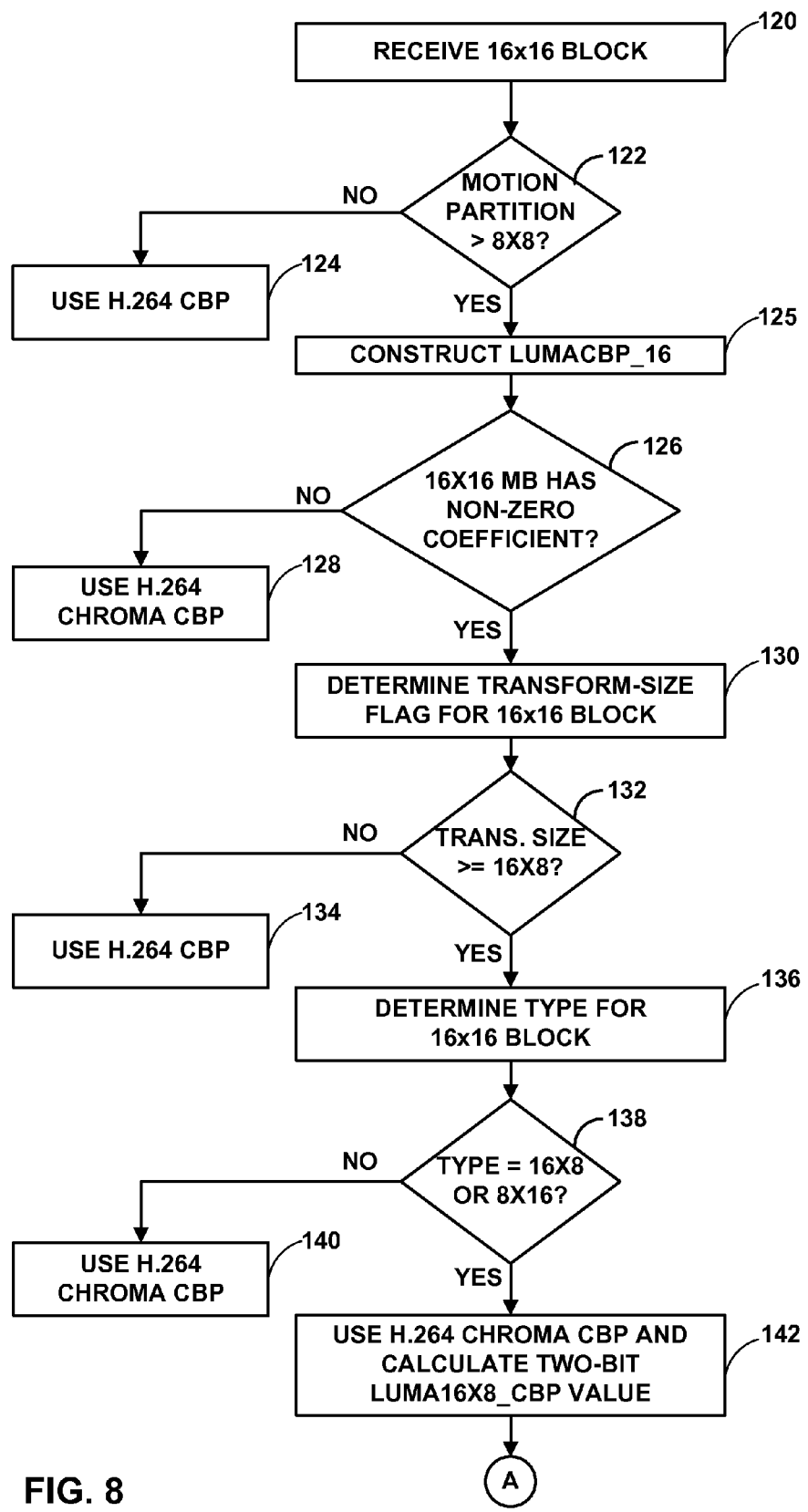
FIG. 8 is a flowchart illustrating an example method for setting a CBP value of a 16×16 pixel partition of a 32×32 pixel partition of a 64×64 pixel large macroblock.

FIG. 8 is a flowchart illustrating an example method for setting a CBP16 value of a 16×16 pixel partition of a 32×32 pixel partition of a 64×64 pixel macroblock. For certain 16×16 pixel partitions, video encoder 50 may utilize CBP values as prescribed by a video coding standard, such as ITU H.264, as discussed below. For other 16×16 partitions, video encoder 50 may utilize CBP values in accordance with other techniques of this disclosure. Initially, as shown in FIG. 8, entropy coding unit 46 receives a 16×16 partition (120), e.g., one of the 16×16 partitions of a 32×32 partition described with respect to FIG. 7.

Entropy coding unit 46 may then determine whether a motion partition for the 16×16 pixel partition is larger than an 8×8 pixel block (122). In general, a motion partition describes a partition in which motion is concentrated. For example, a 16×16 pixel partition with only one motion vector may be considered a 16×16 motion partition. Similarly, for a 16×16 pixel partition with two 8×16 partitions, each having one motion vector, each of the two 8×16 partitions may be considered an 8×16 motion partition. In any case, when the motion partition is not larger than an 8×8 pixel block ("NO" branch of 122), entropy coding unit 46 assigns a CBP value to the 16×16 pixel partition in the same manner as prescribed by ITU H.264 (124), in the example of FIG. 8.

When there exists a motion partition for the 16×16 pixel partition that is larger than an 8×8 pixel block ("YES" branch of 122), entropy coding unit 46 constructs and sends a lumacbp16 value (125) using the steps following step 125. In the example of FIG. 8, to construct the lumacbp16 value, entropy coding unit 46 determines whether the 16×16 pixel luma component of the partition has at least one non-zero coefficient (126). When the 16×16 pixel luma component has all zero coefficients ("NO" branch of 126), entropy coding unit 46 assigns the CBP16 value according to the Coded Block Pattern Chroma portion of ITU H.264 (128), in the example of FIG. 8.

When entropy coding unit 46 determines that the 16×16 pixel luma component has at least one non-zero coefficient ("YES" branch of 126), entropy coding unit 46 determines a transform-size flag for the 16×16 pixel partition (130). The transform-size flag generally indicates a transform being used for the partition. The transform represented by the transform-size flag may include one of a 4×4 transform, an 8×8 transform, a 16×16 transform, a 16×8 transform, or an 8×16 transform. The transform-size flag may comprise an integer value that corresponds to an enumerated value that identifies one of the possible transforms. Entropy coding unit 46 may then determine whether the transform-size flag represents that the transform size is greater than or equal to 16×8 (or 8×16) (132).

When the transform-size flag does not indicate that the transform size is greater than or equal to 16×8 (or 8×16)

("NO" branch of 132), entropy coding unit 46 assigns a value to CBP16 according to ITU H.264 (134), in the example of FIG. 8. When the transform-size flag indicates that the transform size is greater than or equal to 16×8 (or 8×16) ("YES" branch of 132), entropy coding unit 46 then determines whether a type for the 16×16 pixel partition is either two 16×8 or two 8×16 pixel partitions (136).

When the type for the 16×16 pixel partition is not two 16×8 and not two 8×16 pixel partitions ("NO" branch of 138), entropy coding unit 46 assigns the CBP16 value according to the Chroma Coded Block Partition prescribed by ITU H.264 (140), in the example of FIG. 8. When the type for the 16×16 pixel partition is either two 16×8 or two 8×16 pixel partitions ("YES" branch of 136), entropy coding unit 46 also uses the Chroma Coded Block Pattern prescribed by ITU H.264, but in addition assigns the CBP16 value a two-bit luma16×8_CBP value (142), e.g., according to the method described with respect to FIG. 9.

Figure 9:
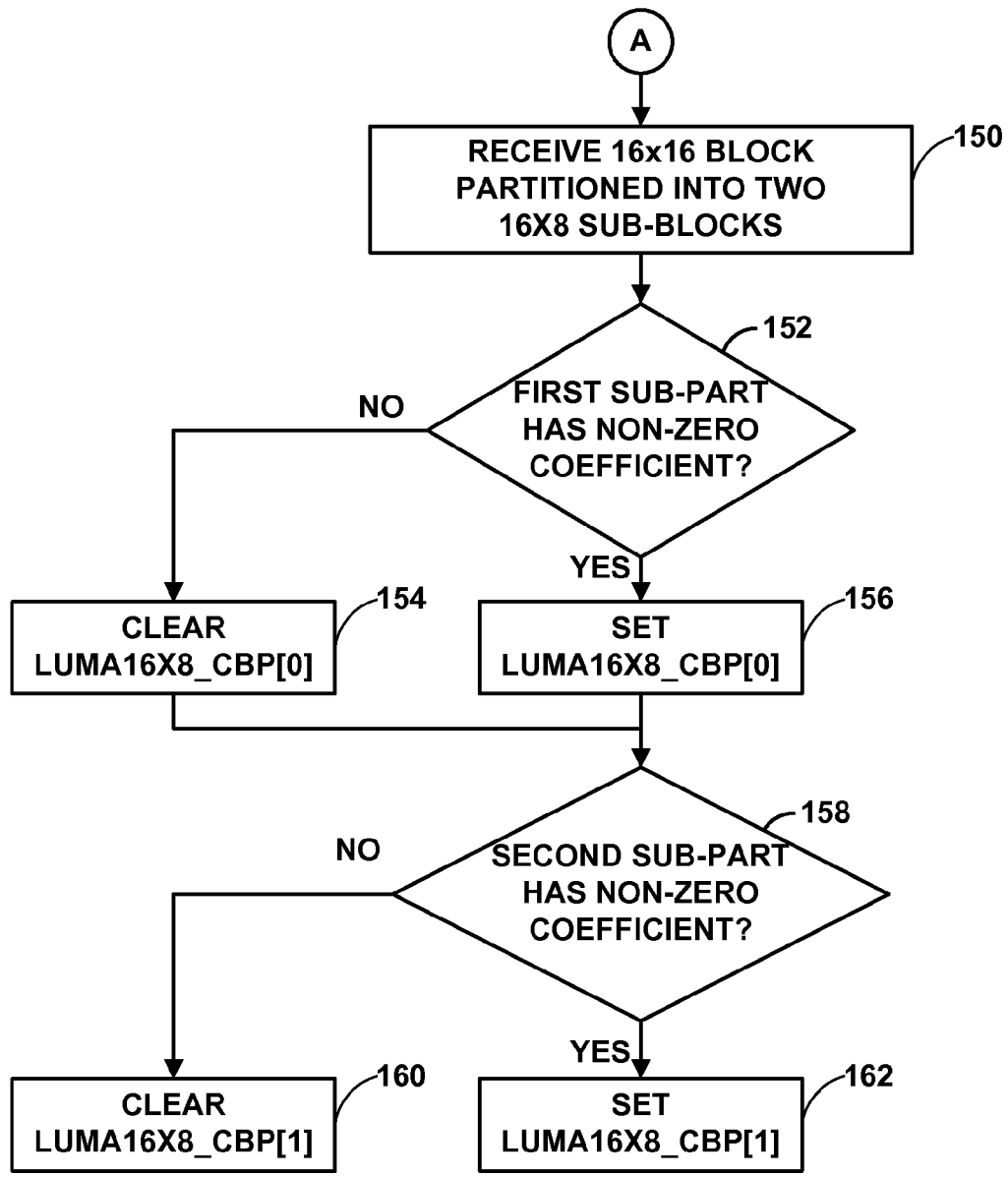
FIG. 9 is a flowchart illustrating an example method for determining a two-bit luma16×8_CBP value.

FIG. 9 is a flowchart illustrating an example method for determining a two-bit luma16×8_CBP value. Entropy coding unit 46 receives a 16×16 pixel partition that is further partitioned into two 16×8 or two 8×16 pixel partitions (150). Entropy coding unit 46 generally assigns each bit of luma16×8_CBP according to whether a corresponding sub-block of the 16×16 pixel partition includes at least one non-zero coefficient.

Entropy coding unit 46 determines whether a first sub-block of the 16×16 pixel partition has at least one non-zero coefficient to determine whether the first sub-block has at least one non-zero coefficient (152). When the first sub-block has all zero coefficients ("NO" branch of 152), entropy coding unit 46 clears the first bit of luma16×8_CBP, e.g., assigns luma16×8_CBP[0] a value of "0" (154). When the first sub-block has at least one non-zero coefficient ("YES" branch of 152), entropy coding unit 46 sets the first bit of luma16×8_CBP, e.g., assigns luma16×8_CBP[0] a value of "1" (156).

Entropy coding unit 46 also determines whether a second sub-partition of the 16×16 pixel partition has at least one non-zero coefficient (158). When the second sub-partition has all zero coefficients ("NO" branch of 158), entropy coding unit 46 clears the second bit of luma16×8_CBP, e.g., assigns luma16×8_CBP[1] a value of "0" (160). When the second sub-block has at least one non-zero coefficient ("YES" branch of 158), entropy coding unit 46 then sets the second bit of luma16×8_CBP, e.g., assigns luma16×8_CBF[1] a value of "1" (162).

The following pseudocode provides one example implementation of the methods described with respect to FIGS. 8 and 9:

```
if (motion partition bigger than 8×8)
{
  lumacbp16
  if (lumacbp16 != 0)
  {
    transform_size_flag
    if (transform_size_flag ==
TRANSFORM_SIZE_GREATER_THAN_16×8)
    {
      if ((mb16_type ==P_16×8) OR (mb16_type==P_8×16))
      {
        luma16×8_cbp
        chroma_cbp
      }
      else
        chroma_cbp
    }
```
```
    else
      h264_cbp
  }
  else
    chroma_cbp
}
else
  h264_cbp
```

In the pseudocode, "lumacbp16" corresponds to an operation of appending a one-bit flag indicating whether an entire 16×16 luma block has nonzero coefficients or not. When "lumacbp16" equals one, there is at least one nonzero coefficient. The function "Transform_size_flag" refers to a calculation performed having a result that indicates the transform being used, e.g., one of a 4×4 transform, 8×8 transform, 16×16 transform (for motion partition equal to or bigger than 16×16), 16×8 transform (for P_16×8), or 8×16 transform (for P_8×16). TRANSFORM_SIZE_GREATER_THAN_16×8 is an enumerated value (e.g., "2") that is used to indicate that a transform size is greater than or equal to 16×8 or 8×16. The result of the transform_size_flag is incorporated into the syntax information of the 64×64 pixel macroblock.

"Luma16×8_cbp" refers to a calculation that produces a two-bit number with each bit indicating whether one of the two partitions of P_16×8 or P_8×16 has nonzero coefficients or not. The two-bit number resulting from luma16×8_cbp is incorporated into the syntax of the 64×64 pixel macroblock. The value "chroma_cbp" may be calculated in the same manner as the CodedBlockPatternChroma as prescribed by ITU H.264. The calculated chroma_cbp value is incorporated into the syntax information of the 64×64 pixel macroblock. The function h264_cbp may be calculated in the same way as the CBP defined in ITU H.264. The calculated H264_cbp value is incorporated into the syntax information of the 64×64 pixel macroblock.

In general, a method according to FIGS. 6-9 may include encoding, with a video encoder, a video block having a size of more than 16×16 pixels, generating block-type syntax information that indicates the size of the block, and generating a coded block pattern value for the encoded block, wherein the coded block pattern value indicates whether the encoded block includes at least one non-zero coefficient.

Figure 10:
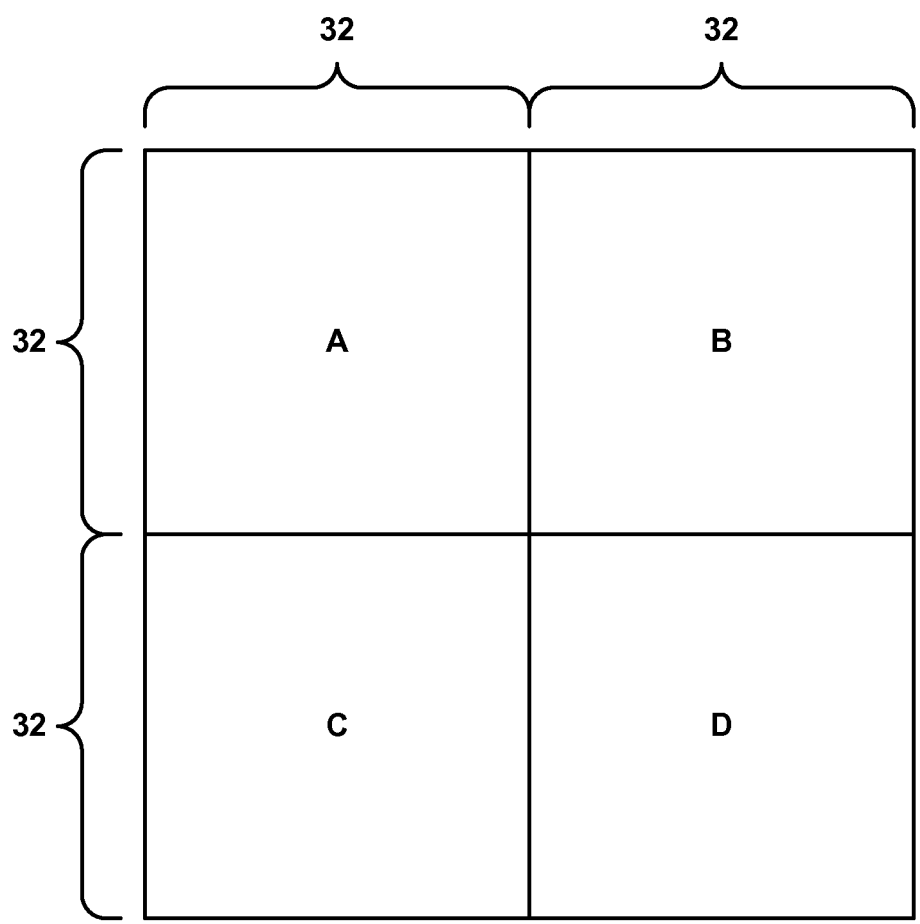
FIG. 10 is a block diagram illustrating an example arrangement of a 64×64 pixel large macroblock.

FIG. 10 is a block diagram illustrating an example arrangement of a 64×64 pixel macroblock. The macroblock of FIG. 10 comprises four 32×32 partitions, labeled A, B, C, and D in FIG. 10. As discussed with respect to FIG. 4A, in one example, a block may be partitioned in any one of four ways: the entire block (64×64) with no sub-partitions, two equal-sized horizontal partitions (32×64 and 32×64), two equal-sized vertical partitions (64×32 and 64×32), or four equal-sized square partitions (32×32, 32×32, 32×32 and 32×32).

In the example of FIG. 10, the whole block partition comprises each of blocks A, B, C, and D; a first one of the two equal-sized horizontal partitions comprises A and B, while a second one of the two equal-sized horizontal partitions comprises C and D; a first one of the two equal-sized vertical partitions comprises A and C, while a second one of the two equal-sized vertical partitions comprises B and D; and the four equal-sized square partitions correspond to one of each of A, B, C, and D. Similar partition schemes can be used for any size block, e.g., larger than 64×64 pixels, 32×32 pixels, 16×16 pixels, 8×8 pixels, or other sizes of video blocks.

When a video block is intra-coded, various methods may be used for partitioning the video block. Moreover, each of the partitions may be intra-coded differently, i.e., with a different mode, such as different intra-modes. For example, a 32×32 partition, such as partition A of FIG. 10, may be further partitioned into four equal-sized blocks of size 16×16 pixels. As one example, ITU H.264 describes three different methods for intra-encoding a 16×16 macroblock, including intra-coding at the 16×16 level, intra-coding at the 8×8 level, and intra-coding at the 4×4 level. However, ITU H.264 prescribes encoding each partition of a 16×16 macroblock using the same intra-coding mode. Therefore, according to ITU H.264, if one sub-block of a 16×16 macroblock is to be intra-coded at the 4×4 level, every sub-block of the 16×16 macroblock must be intra-coded at the 4×4 level.

An encoder configured according to the techniques of this disclosure, on the other hand, may apply a mixed mode approach. For intra-coding, for example, a large macroblock may have various partitions encoded with different coding modes. As an illustration, in a 32×32 partition, one 16×16 partition may be intra-coded at the 4×4 pixel level, while other 16×16 partitions may be intra-coded at the 8×8 pixel level, and one 16×16 partition may be intra-coded at the 16×16 level, e.g., as shown in FIG. 4B.

When a video block is to be partitioned into four equal-sized sub-blocks for intra-coding, the first block to be intra-coded may be the upper-left block, followed by the block immediately to the right of the first block, followed by the block immediately beneath the first block, and finally followed by the block beneath and to the right of the first block. With reference to the example block of FIG. 10, the order of intra-coding would proceed from A to B to C and finally to D. Although FIG. 10 depicts a 64×64 pixel macroblock, intra-coding of a partitioned block of a different size may follow this same ordering.

When a video block is to be inter-coded as part of a P-frame or P-slice, the block may be partitioned into any of the four above-described partitions, each of which may be separately encoded. That is, each partition of the block may be encoded according to a different encoding mode, either intra-encoded (I-coded) or inter-encoded with reference to a single reference frame/slice/list (P-coded). Table 1, below, summarizes inter-encoding information for each potential partition of a block of size N×N. Where Table 1 refers to "M," M=N/2. In Table 1 below, L0 refers to "list 0," i.e., the reference frame/slice/list. When deciding how to best partition the N×N block, an encoder, such as video encoder 50, may analyze rate-distortion cost information for each MB_N_type (i.e., each type of partition) based on a Lagrange multiplier, as discussed in greater detail with respect to FIG. 11, selecting the lowest cost as the best partition method.

TABLE 1

| MB_N_type | Name of MB_N_type | # of parts | Prediction Mode part 1 | Prediction Mode part 2 | Part width | Part height |
|---|---|---|---|---|---|---|
| 0 | P_L0_N×N | 1 | Pred_L0 | N/A | N | N |
| 1 | P_L0_L0_N×M | 2 | Pred_L0 | Pred_L0 | N | M |
| 2 | P_L0_L0_M×N | 2 | Pred_L0 | Pred_L0 | M | N |
| 3 | PN_M×M | 4 | N/A | N/A | M | M |
| inferred | PN_Skip | 1 | Pred_L0 | N/A | N | N |

In Table 1 above, elements of the column "MB_N_type" are keys for each type of partition of an N×N block. Elements of the column "Name of MB_N_type" are names of different partitioning types of an N×N block. "P" in the name refers to the block being inter-coded using P-coding, i.e., with reference to a single frame/slice/list. "L0" in the name refers to the reference frame/slice/list, e.g., "list 0," used as reference frames or slices for P coding. "N×N" refers to the partition being the whole block, "N×M" refers to the partition being two partitions of width N and height M, "M×N" refers to the partition being two partitions of width M and height N, "M×M" refers to the partition being four equal-sized partitions each with width M and height M.

In Table 1, PN_Skip implies that the block was "skipped," e.g., because the block resulting from coding had all zero coefficients. Elements of the column "Prediction Mode part 1" refer to the reference frame/slice/list for sub-partition 1 of the partition, while elements of the column "Prediction Mode part 2" refer to the reference frame/slice/list for sub-partition 2 of the partition. Because P_L0_N×N has only a single partition, the corresponding element of "Prediction Mode part 2" is "N/A," as there is no second sub-partition. For PN_M×M, there exist four partition blocks that may be separately encoded. Therefore, both prediction mode columns for PN_M×M include "N/A." PN_Skip, as with P_L0_N×N, has only a single part, so the corresponding element of column "Prediction Mode part 2" is "N/A."

Table 2, below, includes similar columns and elements to those of Table 1. However, Table 2 corresponds to various encoding modes for an inter-coded block using bi-directional prediction (B-encoded). Therefore, each partition may be encoded by either or both of a first frame/slice/list (L0) and a second frame/slice/list (L1). "BiPred" refers to the corresponding partition being predicted from both L0 and L1. In Table 2, column labels and values are similar in meaning to those used in Table 1.

TABLE 2

| MB_N_type | Name of MB_N_type | # of parts | Prediction Mode part 1 | Prediction Mode part 2 | Part width | Part height |
|---|---|---|---|---|---|---|
| 0 | B_Direct_N×N | Na | Direct | na | N | N |
| 1 | B_L0_N×N | 1 | Pred_L0 | na | N | N |
| 2 | B_L1_N×N | 1 | Pred_L1 | na | N | N |
| 3 | B_Bi_N×N | 1 | BiPred | na | N | N |
| 4 | B_L0_L0_N×M | 2 | Pred_L0 | Pred_L0 | N | M |
| 5 | B_L0_L0_M×N | 2 | Pred_L0 | Pred_L0 | M | N |
| 6 | B_L1_L1_N×M | 2 | Pred_L1 | Pred_L1 | N | M |
| 7 | B_L1_L1_M×N | 2 | Pred_L1 | Pred_L1 | M | N |

TABLE 2-continued

| MB_N_type | Name of MB_N_type | # of parts | Prediction Mode part 1 | Prediction Mode part 2 | Part width | Part height |
|---|---|---|---|---|---|---|
| 8 | B_L0_L1_N×M | 2 | Pred_L0 | Pred_L1 | N | M |
| 9 | B_L0_L1_M×N | 2 | Pred_L0 | Pred_L1 | M | N |
| 10 | B_L1_L0_N×M | 2 | Pred_L1 | Pred_L0 | N | M |
| 11 | B_L1_L0_M×N | 2 | Pred_L1 | Pred_L0 | M | N |
| 12 | B_L0_Bi_N×M | 2 | Pred_L0 | BiPred | N | M |
| 13 | B_L0_Bi_M×N | 2 | Pred_L0 | BiPred | M | N |
| 14 | B_L1_Bi_N×M | 2 | Pred_L1 | BiPred | N | M |
| 15 | B_L1_Bi_M×N | 2 | Pred_L1 | BiPred | M | N |
| 16 | B_Bi_L0_N×M | 2 | BiPred | Pred_L0 | N | M |
| 17 | B_Bi_L0_M×N | 2 | BiPred | Pred_L0 | M | N |
| 18 | B_Bi_L1_N×M | 2 | BiPred | Pred_L1 | N | M |
| 19 | B_Bi_L1_M×N | 2 | BiPred | Pred_L1 | M | N |
| 20 | B_Bi_Bi_N×M | 2 | BiPred | BiPred | N | M |
| 21 | B_Bi_Bi_M×N | 2 | BiPred | BiPred | M | N |
| 22 | BN_M×M | 4 | na | na | M | M |
| inferred | BN_Skip | Na | Direct | na | M | M |

Figure 11:
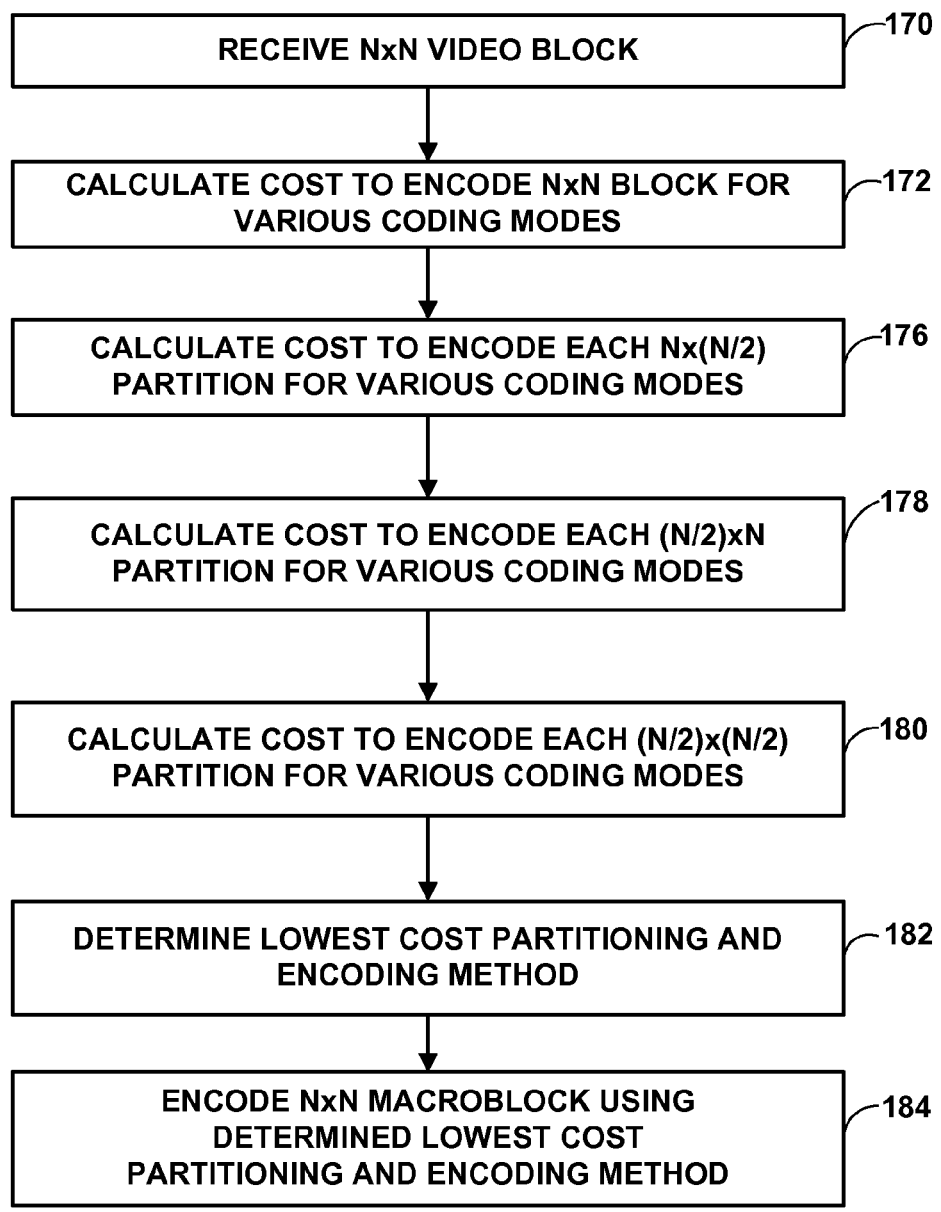
FIG. 11 is a flowchart illustrating an example method for calculating optimal partitioning and encoding methods for an N×N pixel large video block.

FIG. 11 is a flowchart illustrating an example method for calculating optimal partitioning and encoding methods for an N×N pixel video block. In general, the method of FIG. 11 comprises calculating the cost for each different encoding method (e.g., various spatial or temporal modes) as applied to each different partitioning method shown in, e.g., FIG. 4A, and selecting the combination of encoding mode and partitioning method with the best rate-distortion cost for the N×N pixel video block. Cost can be generally calculated using a Lagrange multiplier with rate and distortion values, such that the rate-distortion cost=distortion+$\lambda$*rate, where distortion represents error between an original block and a coded block and rate represents the bit rate necessary to support the coding mode. In some cases, rate and distortion may be determined on a macroblock, partition, slice or frame level.

Initially, video encoder 50 receives an N×N video block to be encoded (170). For example, video encoder 50 may receive a 64×64 large macroblock or a partition thereof, such as, for example, a 32×32 or 16×16 partition, for which video encoder 50 is to select an encoding and partitioning method. Video encoder 50 then calculates the cost to encode the N×N block (172) using a variety of different coding modes, such as different intra- and inter-coding modes. To calculate the cost to spatially encode the N×N block, video encoder 50 may calculate the distortion and the bitrate needed to encode the N×N block with a given coding mode, and then calculate cost=distortion$_{(Mode, N \times N)}$+$\lambda$*rate$_{(Mode, N \times N)}$. Video encoder 50 may encode the macroblock using the specified coding technique and determine the resulting bit rate cost and distortion. The distortion may be determined based on a pixel difference between the pixels in the coded macroblock and the pixels in the original macroblock, e.g., based on a sum of absolute difference (SAD) metric, sum of square difference (SSD) metric, or other pixel difference metric.

Video encoder 50 may then partition the N×N block into two equally-sized non-overlapping horizontal N×(N/2) partitions. Video encoder 50 may calculate the cost to encode each of the partitions using various coding modes (176). For example, to calculate the cost to encode the first N×(N/2) partition, video encoder 50 may calculate the distortion and the bitrate to encode the first N×(N/2) partition, and then calculate cost=distortion$_{(Mode, FIRST\ PARTITION, N \times (N/2))}$+ $\lambda$*rate$_{(Mode, FIRST\ PARTITION, N \times (N/2))}$.

Video encoder 50 may then partition the N×N block into two equally-sized non-overlapping vertical (N/2)×N partitions. Video encoder 50 may calculate the cost to encode each of the partitions using various coding modes (178). For example, to calculate the cost to encode the first one of the (N/2)×N partitions, video encoder 50 may calculate the distortion and the bitrate to encode the first (N/2)×N partition, and then calculate cost= distortion$_{(Mode, FIRST\ PARTITION, (N/2) \times N)}$+$\lambda$* rate$_{(Mode, FIRST\ PARTITION, (N/2) \times N)}$. Video encoder 50 may perform a similar calculation for the cost to encode the second one of the (N/2)×N macroblock partitions.

Video encoder 50 may then partition the N×N block into four equally-sized non-overlapping (N/2)×(N/2) partitions. Video encoder 50 may calculate the cost to encode the partitions using various coding modes (180). To calculate the cost to encode the (N/2)×(N/2) partitions, video encoder 50 may first calculate the distortion and the bitrate to encode the upper-left (N/2)×(N/2) partition and find the cost thereof as cost$_{(Mode, UPPER-LEFT, (N/2) \times (N/2))}$= distortion$_{(Mode, UPPER-LEFT, (N/2) \times (N/2))}$+$\lambda$* rate$_{(Mode, UPPER-LEFT, (N/2) \times (N/2))}$. Video encoder 50 may similarly calculate the cost of each (N/2)×(N/2) block in the order: (1) upper-left partition, (2) upper-right partition, (3) bottom-left partition, (4) bottom-right partition. Video encoder 50 may, in some examples, make recursive calls to this method on one or more of the (N/2)×(N/2) partitions to calculate the cost of partitioning and separately encoding each of the (N/2)×(N/2) partitions further, e.g., as (N/2)×(N/4) partitions, (N/4)×(N/2) partitions, and (N/4)×(N/4) partitions.

Next, video encoder 50 may determine which combination of partitioning and encoding mode produced the best, i.e., lowest, cost in terms of rate and distortion (182). For example, video encoder 50 may compare the best cost of encoding two adjacent (N/2)×(N/2) partitions to the best cost of encoding the N×(N/2) partition comprising the two adjacent (N/2)×(N/2) partitions. When the aggregate cost of encoding the two adjacent (N/2)×(N/2) partitions exceeds the cost to encode the N×(N/2) partition comprising them, video encoder 50 may select the lower-cost option of encoding the N×(N/2) partition. In general, video encoder 50 may apply every combination of partitioning method and encoding mode for each partition to identify a lowest cost partitioning and encoding method. In some cases, video encoder 50 may be configured to evaluate a more limited set of partitioning and encoding mode combinations.

Upon determining the best, e.g., lowest cost, partitioning and encoding methods, video encoder 50 may encode the N×N macroblock using the best-cost determined method (184). In some cases, the result may be a large macroblock having partitions that are coded using different coding modes.

The ability to apply mixed mode coding to a large macroblock, such that different coding modes are applied to different partitions in the large macroblock, may permit the macroblock to be coded with reduced cost.

In some examples, method for coding with mixed modes may include receiving, with video encoder 50, a video block having a size of more than 16×16 pixels, partitioning the block into partitions, encoding one of the partitions with a first encoding mode, encoding another of the partitions with a second coding mode different from the first encoding mode, and generating block-type syntax information that indicates the size of the block and identifies the partitions and the encoding modes used to encode the partitions.

Figure 12:
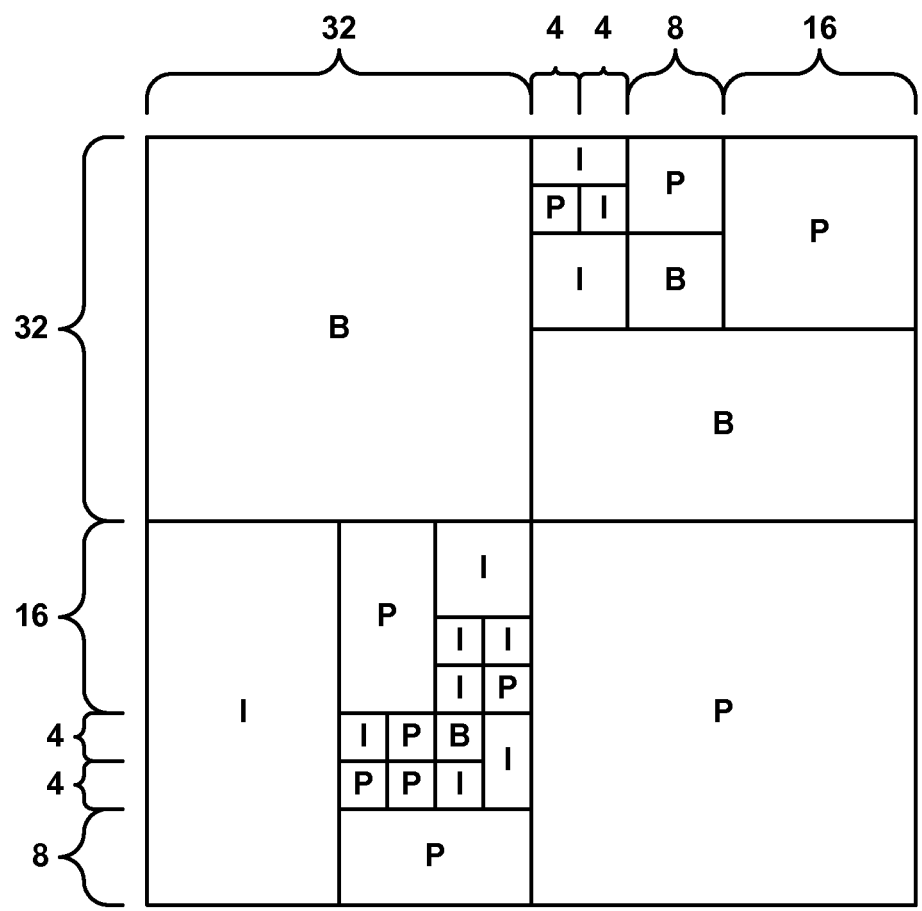
FIG. 12 is a block diagram illustrating an example 64×64 pixel macroblock with various partitions and selected encoding methods for each partition.

FIG. 12 is a block diagram illustrating an example 64×64 pixel large macroblock with various partitions and different selected encoding methods for each partition. In the example of FIG. 12, each partition is labeled with one of an "I," "P," or "B." Partitions labeled "I" are partitions for which an encoder has elected to utilize intra-coding, e.g., based on rate-distortion evaluation. Partitions labeled "P" are partitions for which the encoder has elected to utilize single-reference inter-coding, e.g., based on rate-distortion evaluation. Partitions labeled "B" are partitions for which the encoder has elected to utilize bi-predicted inter-coding, e.g., based on rate-distortion evaluation. In the example of FIG. 12, different partitions within the same large macroblock have different coding modes, including different partition or sub-partition sizes and different intra- or inter-coding modes.

The large macroblock is a macroblock identified by a macroblock syntax element that identifies the macroblock type, e.g., mb64_type or mb32_type, for a given coding standard such as an extension of the H.264 coding standard. The macroblock type syntax element may be provided as a macroblock header syntax element in the encoded video bitstream. The I-, P- and B-coded partitions illustrated in FIG. 12 may be coded according to different coding modes, e.g., intra- or inter-prediction modes with various block sizes, including large block size modes for large partitions greater than 16×16 in size or H.264 modes for partitions that are less than or equal to 16×16 in size.

In one example, an encoder, such as video encoder 50, may use the example method described with respect to FIG. 11 to select various encoding modes and partition sizes for different partitions and sub-partitions of the example large macroblock of FIG. 12. For example, video encoder 50 may receive a 64×64 macroblock, execute the method of FIG. 11, and produce the example macroblock of FIG. 12 with various partition sizes and coding modes as a result. It should be understood, however, that selections for partitioning and encoding modes may result from application of the method of FIG. 11, e.g., based on the type of frame from which the macroblock was selected and based on the input macroblock upon which the method is executed. For example, when the frame comprises an I-frame, each partition will be intra-encoded. As another example, when the frame comprises a P-frame, each partition may either be intra-encoded or inter-coded based on a single reference frame (i.e., without bi-prediction).

The example macroblock of FIG. 12 is assumed to have been selected from a bi-predicted frame (B-frame) for purposes of illustration. In other examples, where a macroblock is selected from a P-frame, video encoder 50 would not encode a partition using bi-directional prediction. Likewise, where a macroblock is selected from an I-frame, video encoder 50 would not encode a partition using inter-coding, either P-encoding or B-encoding. However, in any case, video encoder 50 may select various partition sizes for different portions of the macroblock and elect to encode each partition using any available encoding mode.

In the example of FIG. 12, it is assumed that a combination of partition and mode selection based on rate-distortion analysis has resulted in one 32×32 B-coded partition, one 32×32 P-coded partition, on 16×32 I-coded partition, one 32×16 B-coded partition, one 16×16 P-coded partition, one 16×8 P-coded partition, one 8×16 P-coded partition, one 8×8 P-coded partition, one 8×8 B-coded partition, one 8×8 I-coded partition, and numerous smaller sub-partitions having various coding modes. The example of FIG. 12 is provided for purposes of conceptual illustration of mixed mode coding of partitions in a large macroblock, and should not necessarily be considered representative of actual coding results for a particular large 64×64 macroblock.

Figure 13:
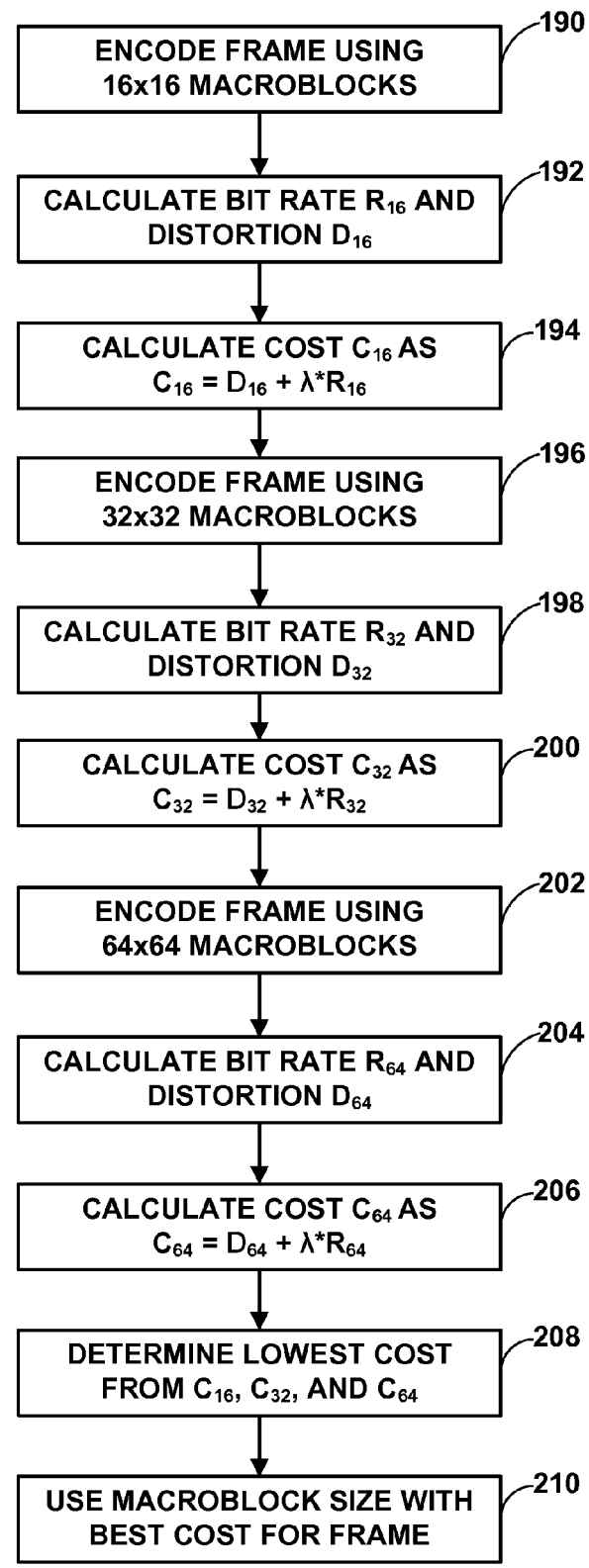
FIG. 13 is a flowchart illustrating an example method for determining an optimal size of a macroblock for encoding a frame of a video sequence.

FIG. 13 is a flowchart illustrating an example method for determining an optimal size of a macroblock for encoding a frame or slice of a video sequence. Although described with respect to selecting an optimal size of a macroblock for a frame, a method similar to that described with respect to FIG. 13 may be used to select an optimal size of a macroblock for a slice. Likewise, although the method of FIG. 13 is described with respect to video encoder 50, it should be understood that any encoder may utilize the example method of FIG. 13 to determine an optimal (e.g., least cost) size of a macroblock for encoding a frame of a video sequence. In general, the method of FIG. 13 comprises performing an encoding pass three times, once for each of a 16×16 macroblock, a 32×32 macroblock, and a 64×64 macroblock, and a video encoder may calculate rate-distortion metrics for each pass to determine which macroblock size provides the best rate-distortion.

Video encoder 50 may first encode a frame using 16×16 pixel macroblocks during a first encoding pass (190), e.g., using a function encode (frame, MB16_type), to produce an encoded frame $F_{16}$. After the first encoding pass, video encoder 50 may calculate the bit rate and distortion based on the use of 16×16 pixel macroblocks as $R_{16}$ and $D_{16}$, respectively (192). Video encoder 50 may then calculate a rate-distortion metric in the form of the cost of using 16×16 pixel macroblocks $C_{16}$ using the Lagrange multiplier $C_{16}=D_{16}+\lambda*R_{16}$ (194). Coding modes and partition sizes may be selected for the 16×16 pixel macroblocks, for example, according to the H.264 standard.

Video encoder 50 may then encode the frame using 32×32 pixel macroblocks during a second encoding pass (196), e.g., using a function encode (frame, MB32_type), to produce an encoded frame $F_{32}$. After the second encoding pass, video encoder 50 may calculate the bit rate and distortion based on the use of 32×32 pixel macroblocks as $R_{32}$ and $D_{32}$, respectively (198). Video encoder 50 may then calculate a rate-distortion metric in the form the cost of using 32×32 pixel macroblocks $C_{32}$ using the Lagrange multiplier $C_{32}=D_{32}+\lambda*R_{32}$ (200). Coding modes and partition sizes may be selected for the 32×32 pixel macroblocks, for example, using rate and distortion evaluation techniques as described with reference to FIGS. 11 and 12.

Video encoder 50 may then encode the frame using 64×64 pixel macroblocks during a third encoding pass (202), e.g., using a function encode (frame, MB64_type), to produce an encoded frame $F_{64}$. After the third encoding pass, video encoder 50 may calculate the bit rate and distortion based on the use of 64×64 pixel macroblocks as $R_{64}$ and $D_{64}$, respectively (204). Video encoder 50 may then calculate a rate-distortion metric in the form of the cost of using 64×64 pixel macroblocks $C_{64}$ using the Lagrange multiplier $C_{64}=D_{64}+\lambda*R_{64}$ (206). Coding modes and partition sizes may be selected for the 64×64 pixel macroblocks, for example, using rate and distortion evaluation techniques as described with reference to FIGS. 11 and 12.

Next, video encoder 50 may determine which of the metrics $C_{16}$, $C_{32}$, and $C_{64}$ is lowest for the frame (208). Video encoder 50 may elect to use the frame encoded with the macroblock size that resulted in the lowest cost (210). Thus, for example, when $C_{16}$ is lowest, video encoder 50 may forward frame $F_{16}$, encoded with the 16×16 macroblocks as the encoded frame in a bitstream for storage or transmission to a decoder. When $C_{32}$ is lowest, video encoder 50 may forward $F_{32}$, encoded with the 32×32 macroblocks. When $C_{64}$ is lowest, video encoder 50 may forward $F_{64}$, encoded with the 64×64 macroblocks.

In other examples, video encoder 50 may perform the encoding passes in any order. For example, video encoder 50 may begin with the 64×64 macroblock encoding pass, perform the 32×32 macroblock encoding pass second, and end with the 16×16 macroblock encoding pass. Also, similar methods may be used for encoding other coded units comprising a plurality of macroblocks, such as slices with different sizes of macroblocks. For example, video encoder 50 may apply a method similar to that of FIG. 13 for selecting an optimal macroblock size for encoding slices of a frame, rather than the entire frame.

Video encoder 50 may also transmit an identifier of the size of the macroblocks for a particular coded unit (e.g., a frame or a slice) in the header of the coded unit for use by a decoder. In accordance with the method of FIG. 13, a method may include receiving, with a digital video encoder, a coded unit of a digital video stream, calculating a first rate-distortion metric corresponding to a rate-distortion for encoding the coded unit using a first plurality of blocks each comprising 16×16 pixels, calculating a second rate-distortion metric corresponding to a rate-distortion for encoding the coded unit using a second plurality of blocks each comprising greater than 16×16 pixels, and determining which of the first rate-distortion metric and the second rate-distortion metric is lowest for the coded unit. The method may further include, when the first rate-distortion metric is determined to be lowest, encoding the coded unit using the first plurality of blocks, and when the second rate-distortion metric is determined to be lowest, encoding the coded unit using the second plurality of blocks.

Figure 14:
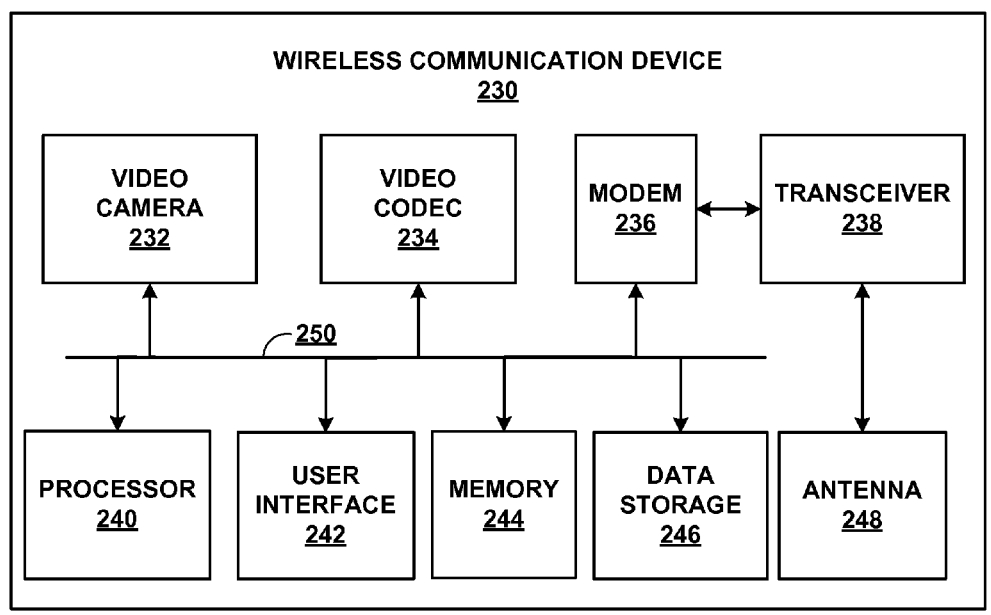
FIG. 14 is a block diagram illustrating an example wireless communication device including a video encoder/decoder (CODEC) that codes digital video data using large macroblocks.

FIG. 14 is a block diagram illustrating an example wireless communication device 230 including a video encoder/decoder CODEC 234 that may encode and/or decode digital video data using the larger-than-standard macroblocks, using any of a variety of the techniques described in this disclosure. In the example of FIG. 14, wireless communication device 230 includes video camera 232, video encoder-decoder (CODEC) 234, modulator/demodulator (modem) 236, transceiver 238, processor 240, user interface 242, memory 244, data storage device 246, antenna 248, and bus 250.

The components included in wireless communication device 230 illustrated in FIG. 14 may be realized by any suitable combination of hardware, software and/or firmware. In the illustrated example, the components are depicted as separate units. However, in other examples, the various components may be integrated into combined units within common hardware and/or software. As one example, memory 244 may store instructions executable by processor 240 corresponding to various functions of video CODEC 234. As another example, video camera 232 may include a video CODEC that performs the functions of video CODEC 234, e.g., encoding and/or decoding video data.

In one example, video camera 232 may correspond to video source 18 (FIG. 1). In general, video camera 232 may record video data captured by an array of sensors to generate digital video data. Video camera 232 may send raw, recorded digital video data to video CODEC 234 for encoding and then to data storage device 246 via bus 250 for data storage. Processor 240 may send signals to video camera 232 via bus 250 regarding a mode in which to record video, a frame rate at which to record video, a time at which to end recording or to change frame rate modes, a time at which to send video data to video CODEC 234, or signals indicating other modes or parameters.

User interface 242 may comprise one or more interfaces, such as input and output interfaces. For example, user interface 242 may include a touch screen, a keypad, buttons, a screen that may act as a viewfinder, a microphone, a speaker, or other interfaces. As video camera 232 receives video data, processor 240 may signal video camera 232 to send the video data to user interface 242 to be displayed on the viewfinder.

Video CODEC 234 may encode video data from video camera 232 and decode video data received via antenna 248, transceiver 238, and modem 236. Video CODEC 234 additionally or alternatively may decode previously encoded data received from data storage device 246 for playback. Video CODEC 234 may encode and/or decode digital video data using macroblocks that are larger than the size of macroblocks prescribed by conventional video encoding standards. For example, video CODEC 234 may encode and/or decode digital video data using a large macroblock comprising 64×64 pixels or 32×32 pixels. The large macroblock may be identified with a macroblock type syntax element according to a video standard, such as an extension of the H.264 standard.

Video CODEC 234 may perform the functions of either or both of video encoder 50 (FIG. 2) and/or video decoder 60 (FIG. 3), as well as any other encoding/decoding functions or techniques as described in this disclosure. For example, CODEC 234 may partition a large macroblock into a variety of differently sized, smaller partitions, and use different coding modes, e.g., spatial (I) or temporal (P or B), for selected partitions. Selection of partition sizes and coding modes may be based on rate-distortion results for such partition sizes and coding modes. CODEC 234 also may utilize hierarchical coded block pattern (CBP) values to identify coded macroblocks and partitions having non-zero coefficients within a large macroblock. In addition, in some examples, CODEC 234 may compare rate-distortion metrics for large and small macroblocks to select a macroblock size producing more favorable results for a frame, slice or other coding unit.

A user may interact with user interface 242 to transmit a recorded video sequence in data storage device 246 to another device, such as another wireless communication device, via modem 236, transceiver 238, and antenna 248. The video sequence may be encoded according to an encoding standard, such as MPEG-2, MPEG-3, MPEG-4, H.263, H.264, or other video encoding standards, subject to extensions or modifications described in this disclosure. For example, the video sequence may also be encoded using larger-than-standard macroblocks, as described in this disclosure. Wireless communication device 230 may also receive an encoded video segment and store the received video sequence in data storage device 246.

Macroblocks of the received, encoded video sequence may be larger than macroblocks specified by conventional video encoding standards. To display an encoded video segment in data storage device 246, such as a recorded video sequence or a received video segment, video CODEC 234 may decode the video sequence and send decoded frames of the video segment to user interface 242. When a video sequence includes audio data, video CODEC 234 may decode the audio, or wireless communication device 230 may further include an audio codec (not shown) to decode the audio. In this manner, video CODEC 234 may perform both the functions of an encoder and of a decoder.

Memory 244 of wireless communication device 230 of FIG. 14 may be encoded with computer-readable instructions that cause processor 240 and/or video CODEC 234 to perform various tasks, in addition to storing encoded video data. Such instructions may be loaded into memory 244 from a data storage device such as data storage device 246. For example, the instructions may cause processor 240 to perform the functions described with respect to video CODEC 234.

Figure 15:
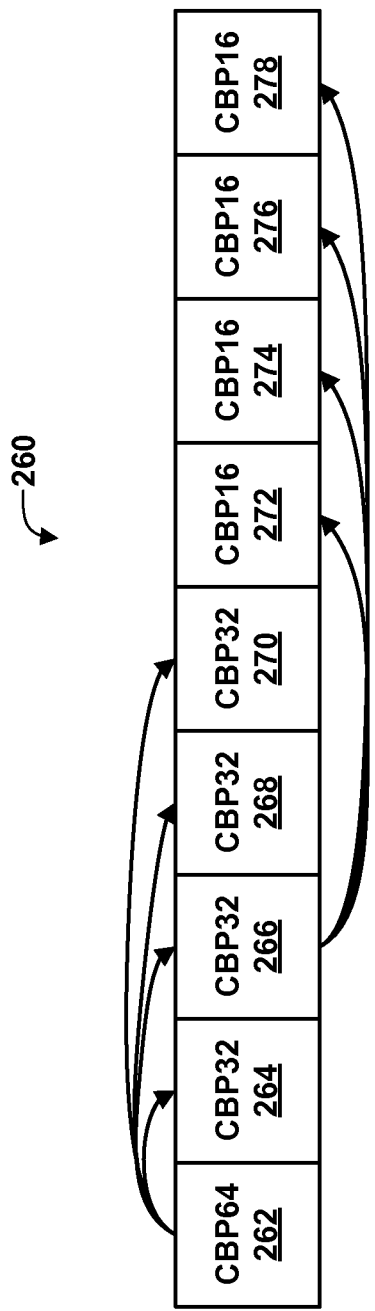
FIG. 15 is a block diagram illustrating an example array representation of a hierarchical CBP representation for a large macroblock.

FIG. 15 is a block diagram illustrating an example hierarchical coded block pattern (CBP) 260. The example of CBP 260 generally corresponds to a portion of the syntax information for a 64×64 pixel macroblock. In the example of FIG. 15, CBP 260 comprises a CBP64 value 262, four CBP32 values 264, 266, 268, 270, and four CBP16 values 272, 274, 276, 278. Each block of CBP 260 may include one or more bits. In one example, when CBP64 value 262 is a bit with a value of "1," indicating that there is at least one non-zero coefficient in the large macroblock, CBP 260 includes the four CBP32 values 264, 266, 268, 270 for four 32×32 partitions of the large 64×64 macroblock, as shown in the example of FIG. 15.

In another example, when CBP64 value 262 is a bit with a value of "0," CBP 260 may consist only of CBP64, as a value of "0" may indicate that the block corresponding to CBP 260 has all zero-valued coefficients. Hence, all partitions of that block likewise will contain all zero-valued coefficients. In one example, when a CBP64 is a bit with a value of "1," and one of the CBP32 values for a particular 32×32 partition is a bit with a value of "1," the CBP32 value for the 32×32 partition has four branches, representative of CBP16 values, e.g., as shown with respect to CBP32 value 266. In one example, when a CBP32 value is a bit with a value of "0," the CBP32 does not have any branches. In the example of FIG. 15, CBP 260 may have a five-bit prefix of "10100," indicating that the CBP64 value is "1," and that one of the 32×32 partitions has a CBP32 value of "1," with subsequent bits corresponding to the four CBP16 values 272, 274, 276, 278 corresponding to 16×16 partitions of the 32×32 partition with the CBP 32 value of "1." Although only a single CBP32 value is shown as having a value of "1" in the example of FIG. 15, in other examples, two, three or all four 32×32 partitions may have CBP32 values of "1," in which case multiple instances of four 16×16 partitions with corresponding CBP16 values would be required.

In the example of FIG. 15, the four CBP16 values 272, 274, 276, 278 for the four 16×16 partitions may be calculated according to various methods, e.g., according to the methods of FIGS. 8 and 9. Any or all of CBP16 values 272, 274, 276, 278 may include a "lumacbp16" value, a transform_size_flag, and/or a luma16×8_cbp. CBP16 values 272, 274, 276, 278 may also be calculated according to a CBP value as defined in ITU H.264 or as a CodedBlockPatternChroma in ITU H.264, as discussed with respect to FIGS. 8 and 9. In the example of FIG. 15, assuming that CBP16 278 has a value of "1," and the other CBP 16 values 272, 274, 276 have values of "0," the nine-bit CBP value for the 64×64 macroblock would be "101000001," where each bit corresponds to one of the partitions at a respective level in the CBP/partition hierarchy.

Figure 16:
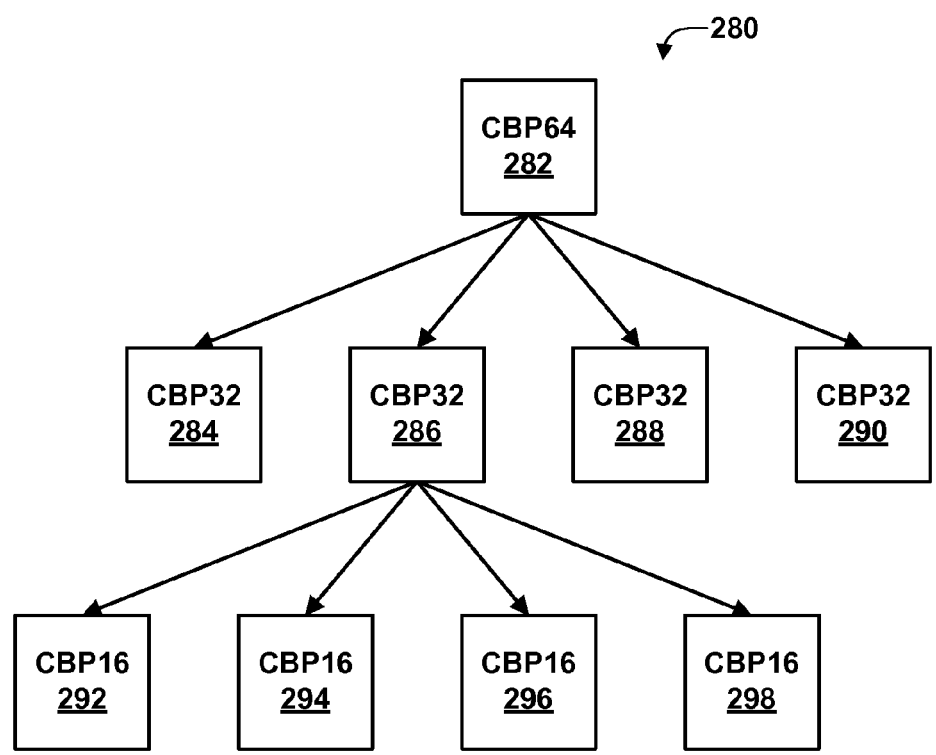
FIG. 16 is a block diagram illustrating an example tree structure corresponding to the hierarchical CBP representation of FIG. 15.

FIG. 16 is a block diagram illustrating an example tree structure 280 corresponding to CBP 260 (FIG. 15). CBP64 node 282 corresponds to CBP64 value 262, CBP32 nodes 284, 286, 288, 290 each correspond to respective ones of CBP32 values 264, 266, 268, 270, and CBP16 nodes 292, 294, 296, 298 each correspond to respective ones of CBP16 values 272, 274, 276, 278. In this manner, a coded block pattern value as defined in this disclosure may correspond to a hierarchical CBP. Each node yielding another branch in the tree corresponds to a respective CBP value of "1." In the examples of FIGS. 15 and 16, CBP64 282 and CBP32 286 both have values of "1," and yield further partitions with possible CBP values of "1," i.e., where at least one partition at the next partition level includes at least one non-zero transform coefficient value.

Figure 17:
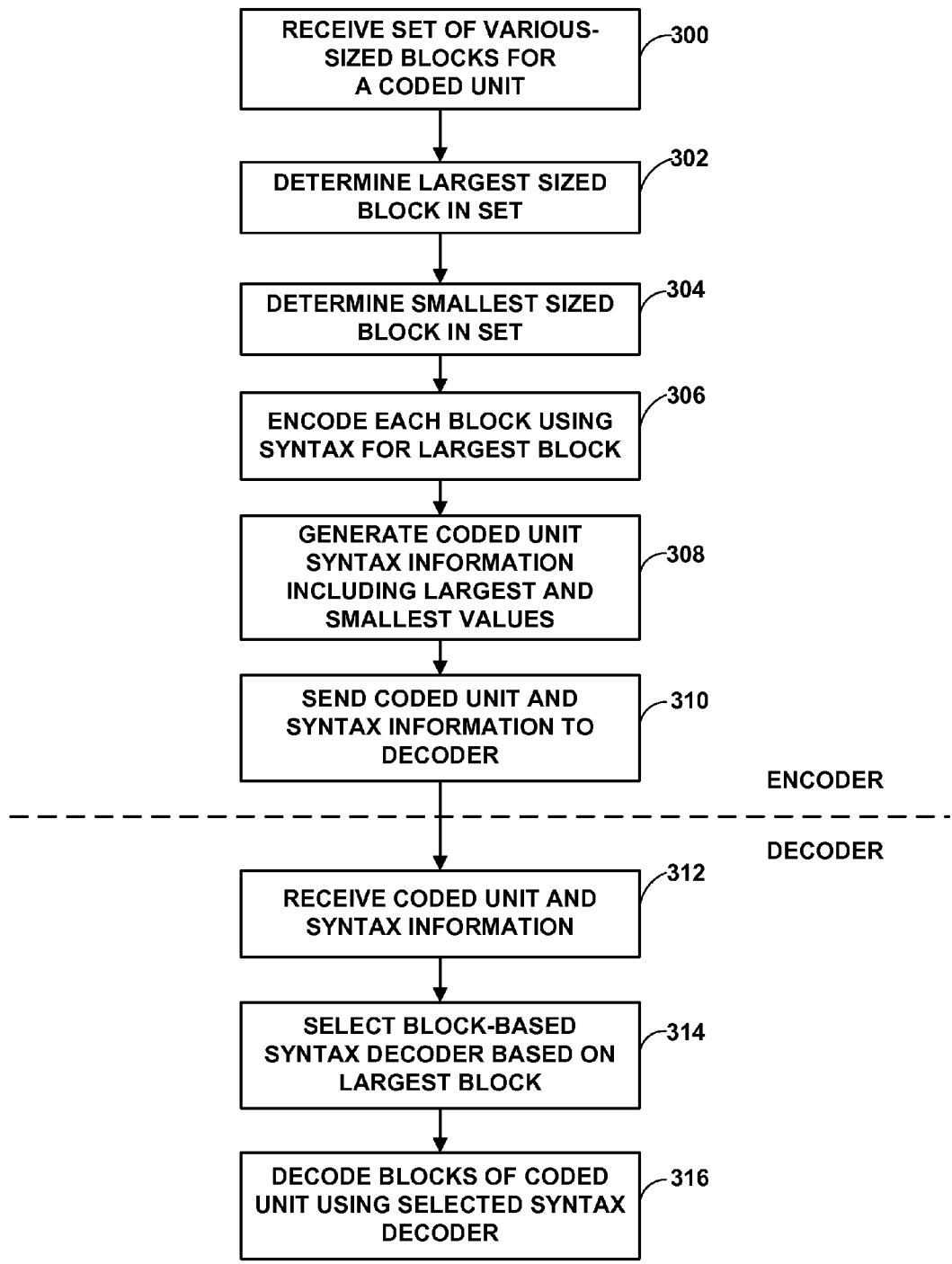
FIG. 17 is a flowchart illustrating an example method for using syntax information of a coded unit to indicate and select block-based syntax encoders and decoders for video blocks of the coded unit.

FIG. 17 is a flowchart illustrating an example method for using syntax information of a coded unit to indicate and select block-based syntax encoders and decoders for video blocks of the coded unit. In general, steps 300 to 310 of FIG. 17 may be performed by a video encoder, such as video encoder 20 (FIG. 1), in addition to and in conjunction with encoding a plurality of video blocks for a coded unit. A coded unit may comprise a video frame, a slice, or a group of pictures (also referred to as a "sequence"). Steps 312 to 316 of FIG. 17 may be performed by a video decoder, such as video decoder 30 (FIG. 1), in addition to and in conjunction with decoding the plurality of video blocks of the coded unit.

Initially, video encoder 20 may receive a set of various-sized blocks for a coded unit, such as a frame, slice, or group of pictures (300). In accordance with the techniques of this disclosure, one or more of the blocks may comprise greater than 16×16 pixels, e.g., 32×32 pixels, 64×64 pixels, etc. However, the blocks need not each include the same number of pixels. In general, video encoder 20 may encode each of the blocks using the same block-based syntax. For example, video encoder 20 may encode each of the blocks using a hierarchical coded block pattern, as described above.

Video encoder 20 may select the block-based syntax to use based on a largest block, i.e., maximum block size, in the set of blocks for the coded unit. The maximum block size may correspond to the size of a largest macroblock included in the coded unit. Accordingly, video encoder 20 may determine the largest sized block in the set (302). In the example of FIG. 17, video encoder 20 may also determine the smallest sized block in the set (304). As discussed above, the hierarchical coded block pattern of a block has a length that corresponds to whether partitions of the block have a non-zero, quantized coefficient. In some examples, video encoder 20 may include a minimum size value in syntax information for a coded unit. In some examples, the minimum size value indicates the minimum partition size in the coded unit. The minimum partition size, e.g., the smallest block in a coded unit, in this manner may be used to determine a maximum length for the hierarchical coded block pattern.

Video encoder 20 may then encode each block of the set for the coded unit according to the syntax corresponding to the largest block (306). For example, assuming that the largest block comprises a 64×64 pixel block, video encoder 20 may use syntax such as that defined above for MB64_type. As another example, assuming that the largest block comprises a 32×32 pixel block, video encoder 20 may use the syntax such as that defined above for MB32_type.

Video encoder 20 also generates coded unit syntax information, which includes values corresponding to the largest block in the coded unit and the smallest block in the coded unit (308). Video encoder 20 may then transmit the coded unit, including the syntax information for the coded unit and each of the blocks of the coded unit, to video decoder 30.

Video decoder 30 may receive the coded unit and the syntax information for the coded unit from video encoder 20 (312). Video decoder 30 may select a block-based syntax decoder based on the indication in the coded unit syntax information of the largest block in the coded unit (314). For example, assuming that the coded unit syntax information indicated that the largest block in the coded unit comprised 64×64 pixels, video decoder 30 may select a syntax decoder for MB64_type blocks. Video decoder 30 may then apply the selected syntax decoder to blocks of the coded unit to decode the blocks of the coded unit (316). Video decoder 30 may also determine when a block does not have further separately encoded sub-partitions based on the indication in the coded unit syntax information of the smallest encoded partition. For example, if the largest block is 64×64 pixels and the smallest block is also 64×64 pixels, then it can be determined that the 64×64 blocks are not divided into sub-partitions smaller than the 64×64 size. As another example, if the largest block is 64×64 pixels and the smallest block is 32×32 pixels, then it can be determined that the 64×64 blocks are divided into sub-partitions no smaller than 32×32.

In this manner, video decoder 30 may remain backwards-compatible with existing coding standards, such as H.264. For example, when the largest block in a coded unit comprises 16×16 pixels, video encoder 20 may indicate this in the coded unit syntax information, and video decoder 30 may apply standard H.264 block-based syntax decoders. However, when the largest block in a coded unit comprises more than 16×16 pixels, video encoder 20 may indicate this in the coded unit syntax information, and video decoder 30 may selectively apply a block-based syntax decoder in accordance with the techniques of this disclosure to decode the blocks of the coded unit.

In one or more examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various examples have been described. These and other examples are within the scope of the following claims.

The invention claimed is:

1. A method of decoding video data, the method comprising:
   decoding one or more syntax elements associated with a sequence of pictures, comprising:
   decoding a first syntax element representative of a maximum size for the blocks of the sequence of pictures; and
   decoding a second syntax element representative of a minimum size for the blocks of the sequence of pictures,
   wherein values for the first and second syntax elements represent a range of sizes for blocks of the sequence of pictures, wherein the maximum size in the range of sizes is greater than 16×16 pixels; and
   decoding at least one block of the blocks of the sequence of pictures, the at least one block having a size within the range of sizes represented by the values for the first and second syntax elements.

2. The method of claim 1, wherein the at least one block has a size that is less than the maximum size and greater than the minimum size.

3. The method of claim 1, further comprising decoding one or more syntax elements representative of partitioning for the blocks.

4. The method of claim 1, wherein decoding comprises decoding by a video decoder.

5. The method of claim 1, wherein decoding comprises decoding by an application specific integrated circuit (ASIC).

6. The method of claim 1, wherein decoding comprises decoding by a processor.

7. A device for decoding video data, the device comprising:
   a memory configured to store video data; and
   a video decoder in communication with the memory and configured to:
   decode one or more syntax elements associated with a sequence of pictures,
   wherein to decode the one or more syntax elements, the video decoder is configured to decode a first syntax element representative of the maximum size for the blocks of the sequence of pictures, and to decode a second syntax element representative of a minimum size for the blocks of the sequence of pictures,
   wherein values for the one or more syntax elements represent a range of sizes for blocks of the sequence of pictures, wherein the maximum size in the range of sizes is greater than 16×16 pixels; and
   decode at least one block of the blocks of the sequence of pictures, the at least one block having a size within the range of sizes represented by the values for the first and second syntax elements.

8. The device of claim 7, wherein the at least one block has a size that is less than the maximum size and greater than the minimum size.

9. The device of claim 7, wherein the video decoder is further configured to decode one or more syntax elements representative of partitioning for the blocks.

10. The device of claim 7, wherein the video decoder comprises an application specific integrated circuit (ASIC).

11. The device of claim 7, wherein the video decoder comprises a processor.

12. A device for decoding video data, the device comprising:
    means for decoding one or more syntax elements associated with a sequence of pictures comprising:
    means for decoding a first syntax element representative of the maximum size for the blocks of the sequence of pictures; and
    means for decoding a second syntax element representative of a minimum size for the blocks of the sequence of pictures,
    wherein values for the one or more syntax elements represent a range of sizes for blocks of the sequence of pictures, wherein the maximum size in the range of sizes is greater than 16×16 pixels; and means for decoding at least one block of the blocks of the sequence of pictures, the at least one block having a size within the range of sizes represented by the values for the first and second syntax elements.

13. The device of claim 12, wherein the at least one block has a size that is less than the maximum size and greater than the minimum size.

14. The device of claim 12, further comprising means for decoding one or more syntax elements representative of partitioning for the blocks.

15. A non-transitory computer-readable storage medium having stored thereon instructions that, when executed, cause a processor to:
   decode one or more syntax elements associated with a sequence of pictures, wherein the instructions that cause the processor to decode the one or more syntax elements comprise instructions that cause the processor to:
      decode a first syntax element representative of the maximum size for the blocks of the sequence of pictures; and
      decode a second syntax element representative of a minimum size for the blocks of the sequence of pictures,
   wherein values for the one or more syntax elements represent a range of sizes for blocks of the sequence of pictures, wherein the maximum size in the range of sizes is greater than 16×16 pixels; and
   decode at least one block of the blocks of the sequence of pictures, the at least one block having a size within the range of sizes represented by the values for the first and second syntax elements.

16. The computer-readable storage medium of claim 15, wherein the at least one block has a size that is less than the maximum size and greater than the minimum size.

17. The computer-readable storage medium of claim 15, further comprising instructions that cause the processor to decode one or more syntax elements representative of partitioning for the blocks.

18. A method of encoding video data, the method comprising:
   encoding one or more syntax elements associated with a sequence of pictures comprising:
      encoding a first syntax element representative of the maximum size for the blocks of the sequence of pictures; and
      encoding a second syntax element representative of a minimum size for the blocks of the sequence of pictures,
   wherein values for the one or more syntax elements represent a range of sizes for blocks of the sequence of pictures, wherein the maximum size in the range of sizes is greater than 16×16 pixels; and
   encoding at least one block of the blocks of the sequence of pictures, the at least one block having a size within the range of sizes represented by the values for the first and second syntax elements.

19. The method of claim 18, wherein the at least one block has a size that is less than the maximum size and greater than the minimum size.

20. The method of claim 18, further comprising encoding one or more syntax elements representative of partitioning for the blocks.

21. The method of claim 18, wherein encoding comprises encoding by a video encoder.

22. The method of claim 18, wherein encoding comprises encoding by an application specific integrated circuit (ASIC).

23. The method of claim 18, wherein encoding comprises encoding by a processor.

24. A device for encoding video data, the device comprising:
   a memory configured to store video data; and
   a video encoder in communication with the memory and configured to:
      encode one or more syntax elements associated with a sequence of pictures, wherein to encode the one or more syntax elements, the video encoder is configured to encode a first syntax element representative of the maximum size for the blocks of the sequence of pictures, and to encode a second syntax element representative of a minimum size for the blocks of the sequence of pictures,
      wherein values for the one or more syntax elements represent a range of sizes for blocks of the sequence of pictures, wherein the maximum size in the range of sizes is greater than 16×16 pixels; and
      encode at least one block of the blocks of the sequence of pictures, the at least one block having a size within the range of sizes represented by the values for the first and second syntax elements.

25. The device of claim 24, wherein the at least one block has a size that is less than the maximum size and greater than the minimum size.

26. The device of claim 24, wherein the video encoder is further configured to encode one or more syntax elements representative of partitioning for the blocks.

27. The device of claim 24, wherein the video encoder comprises an application specific integrated circuit (ASIC).

28. The device of claim 24, wherein the video encoder comprises a processor.

29. A device for encoding video data, the device comprising:
   means for encoding one or more syntax elements associated with a sequence of pictures comprising:
      means for encoding a first syntax element representative of the maximum size for the blocks of the sequence of pictures; and
      means for encoding a second syntax element representative of a minimum size for the blocks of the sequence of pictures,
   wherein values for the one or more syntax elements represent a range of sizes for blocks of the sequence of pictures, wherein the maximum size in the range of sizes is greater than 16×16 pixels; and
   means for encoding at least one block of the blocks of the sequence of pictures, the at least one block having a size within the range of sizes represented by the values for the first and second syntax elements.

30. The device of claim 29, wherein the at least one block has a size that is less than the maximum size and greater than the minimum size.

31. The device of claim 29, further comprising means for encoding one or more syntax elements representative of partitioning for the blocks.

32. A non-transitory computer-readable storage medium having stored thereon instructions that, when executed, cause a processor to:
   encode one or more syntax elements associated with a sequence of pictures, wherein the instructions that cause the processor to encode the one or more syntax elements comprise instructions that cause the processor to:
      encode a first syntax element representative of the maximum size for the blocks of the sequence of pictures; and encode a second syntax element representative of a minimum size for the blocks of the sequence of pictures, wherein values for the one or more syntax elements represent a range of sizes for blocks of the sequence of pictures, wherein the maximum size in the range of sizes is greater than 16×16 pixels; and encode at least one block of the blocks of the sequence of pictures, the at least one block having a size within the range of sizes represented by the values for the first and second syntax elements.

33. The computer-readable storage medium of claim 32, wherein the at least one block has a size that is less than the maximum size and greater than the minimum size.

34. The computer-readable storage medium of claim 32, further comprising instructions that cause the processor to encode one or more syntax elements representative of partitioning for the blocks.

* * * * *